US008222350B2

(12) United States Patent
DeRudder

(10) Patent No.: US 8,222,350 B2
(45) Date of Patent: *Jul. 17, 2012

(54) LOW GLOSS POLYCARBONATE COMPOSITIONS

(75) Inventor: James Louis DeRudder, Mount Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 1194 days.

This patent is subject to a terminal disclaimer.

(21) Appl. No.: 11/673,946

(22) Filed: Feb. 12, 2007

(65) Prior Publication Data
US 2008/0194755 A1  Aug. 14, 2008

(51) Int. Cl.
C08L 55/02 (2006.01)
C08L 83/04 (2006.01)

(52) U.S. Cl. .......... 525/461; 525/65; 525/233; 524/525; 524/506; 524/537; 524/261; 524/502; 528/196

(58) Field of Classification Search .................. 524/315, 524/506, 612, 115, 525, 537, 261, 502; 525/244, 525/65, 233, 461; 528/196
See application file for complete search history.

(56) References Cited

U.S. PATENT DOCUMENTS

| 3,489,821 A | 1/1970 | Witt et al. |
| 3,511,895 A | 5/1970 | Kydonieus et al. |
| 3,981,944 A | 9/1976 | Okamoto et al. |
| 4,046,836 A | 9/1977 | Adelmann et al. |
| 4,126,602 A | 11/1978 | Salee |
| 4,284,549 A | 8/1981 | Salee |
| 4,304,709 A | 12/1981 | Salee |
| 4,327,012 A | 4/1982 | Salee |
| 4,348,500 A | 9/1982 | Robeson et al. |
| 4,526,926 A | 7/1985 | Weber et al. |
| 4,530,965 A | 7/1985 | Bourland |
| 4,542,187 A | 9/1985 | Dean |
| 4,624,986 A | 11/1986 | Weber et al. |
| 4,677,162 A | 6/1987 | Grigo et al. |
| 4,696,972 A | 9/1987 | Bourland |
| 4,746,701 A | 5/1988 | Kress et al. |
| 4,767,818 A | 8/1988 | Boutni |
| 4,788,252 A | 11/1988 | de Boer et al. |
| 4,868,244 A | 9/1989 | Boutni |
| 4,885,335 A | 12/1989 | Gallucci et al. |
| 4,885,336 A | 12/1989 | Boutni et al. |
| 4,902,743 A | 2/1990 | Boutni |
| 4,906,689 A | 3/1990 | Boutni |
| 4,931,503 A | 6/1990 | Boutni et al. |
| 4,987,187 A | 1/1991 | Udipi et al. |
| 5,026,777 A | 6/1991 | Jalbert et al. |
| 5,026,791 A | 6/1991 | Hawkins et al. |
| 5,047,475 A | 9/1991 | Ogawa et al. |
| 5,061,754 A | 10/1991 | Dufour et al. |
| 5,223,573 A | 6/1993 | Kuruganti et al. |
| 5,236,990 A | 8/1993 | Vilasagar |
| 5,302,646 A | 4/1994 | Vilasagar et al. |
| 5,310,791 A | 5/1994 | Vilasagar |
| 5,336,701 A | 8/1994 | Wildi et al. |
| 5,369,154 A | 11/1994 | Laughner |
| 5,369,172 A | 11/1994 | Morgan et al. |
| 5,414,045 A | 5/1995 | Sue et al. |
| 5,530,062 A | 6/1996 | Bradtke et al. |
| 5,536,780 A | 7/1996 | Bhatia et al. |
| 5,552,224 A | 9/1996 | Laughner et al. |
| 5,580,924 A | 12/1996 | Wildi et al. |
| 5,612,420 A | 3/1997 | Yoo et al. |
| 5,965,665 A | 10/1999 | Fukuyama et al. |
| 6,037,409 A | 3/2000 | Schmid et al. |
| 6,072,011 A | 6/2000 | Hoover |
| 6,239,221 B1 | 5/2001 | Chen |
| 6,376,605 B1 | 4/2002 | Sugimoto et al. |
| 6,391,965 B1 | 5/2002 | Koura et al. |
| 6,444,753 B1 | 9/2002 | Mangnus et al. |
| 6,476,126 B1 | 11/2002 | Chen et al. |
| 6,476,128 B1 | 11/2002 | Berzinis |
| 6,545,089 B1 | 4/2003 | DeRudder et al. |
| 6,812,282 B2 | 11/2004 | Chang et al. |
| 6,987,141 B2 | 1/2006 | Okamoto et al. |
| 7,365,125 B2 | 4/2008 | Govaerts et al. |
| 7,723,428 B2 | 5/2010 | DeRudder et al. |

(Continued)

FOREIGN PATENT DOCUMENTS

| CA | 2025376 | 5/1991 |
| CA | 2025377 | 5/1991 |
| CA | 2033903 C | 7/1992 |
| DE | 3628904 A1 | 3/1988 |
| EP | 0546757 A1 | 6/1993 |
| EP | 0558265 B1 | 9/1993 |

(Continued)

OTHER PUBLICATIONS

ASTM D2457-03, "Standard Test Method for Specular Gloss of Plastic Films and Solid Plastics", pp. 1-5. English abstract for EP0261382 Publication Date Mar. 30, 1988; esp@cenet (1 page).
International Search Report for PCT/US20071073029; International Filing Date , Jul. 9, 2007; Mailing Date Nov. 21, 2007 (6 pages).
Written Opinion of the International Searching Authority for PCT/US2007/073029; International Filing Date Jul. 9, 2007; Mailing Date Nov. 21, 2007 (8 pages).
International Search Report for PCT/US20071073038; International Filing Date Jul. 9, 2007; Mailing Date Jan. 14, 2008 (5 pages).
Written Opinion of the International Searching Authority for PCT/US2007/073038; International Filing Date Jul. 9, 2007; Mailing Date Jan. 14, 2008 (6 pages).
PCT International Search Report for International Application No. PCT/US2008/069407.

*Primary Examiner* — Vasu Jagannathan
*Assistant Examiner* — Mark Kaucher
(74) *Attorney, Agent, or Firm* — Cantor Colburn LLP

(57) ABSTRACT

A thermoplastic composition comprising in combination a polycarbonate, a polycarbonate-polysiloxane copolymer, an impact modifier composition comprising ABS or BABS, a second impact modifier different from BABS or ABS, an aromatic vinyl copolymer, and optionally a gel-type low gloss additive, wherein the 60° gloss of the thermoplastic composition is measured to be less than or equal to 14 GU on 3 millimeter chips having a textured surface when measured according to ASTM D2457, and wherein a molded sample of the thermoplastic composition has a low temperature notched Izod impact at −40° C. of at least 65 KJ/m$^2$ when measured according to ISO 180/1A is disclosed. The composition has low gloss, high low temperature impact, and a significantly improved balance of properties.

20 Claims, No Drawings

U.S. PATENT DOCUMENTS

| | | |
|---|---|---|
| 2003/0092837 A1 | 5/2003 | Eichenauer |
| 2003/0119986 A1 | 6/2003 | Eichenauer |
| 2004/0030044 A1 | 2/2004 | Okamoto et al. |
| 2004/0152806 A1 | 8/2004 | Koga et al. |
| 2006/0004154 A1 | 1/2006 | DeRudder et al. |
| 2006/0030647 A1 * | 2/2006 | Ebeling et al. ............... 524/115 |
| 2006/0074156 A1 | 4/2006 | Ebeling et al. |
| 2006/0142486 A1 | 6/2006 | DeRudder et al. |
| 2006/0199879 A1 | 9/2006 | Agarwal et al. |
| 2007/0010618 A1 | 1/2007 | Chen et al. |
| 2007/0010635 A1 | 1/2007 | Chen et al. |
| 2007/0049706 A1 | 3/2007 | Siripurapu et al. |
| 2007/0072960 A1 | 3/2007 | Ma et al. |
| 2007/0072961 A1 | 3/2007 | Ma et al. |
| 2007/0093591 A1 | 4/2007 | Ma et al. |
| 2007/0105994 A1 | 5/2007 | Li et al. |
| 2008/0194756 A1 | 8/2008 | DeRudder |

FOREIGN PATENT DOCUMENTS

| | | |
|---|---|---|
| EP | 0622416 A2 | 11/1994 |
| EP | 0635547 A2 | 1/1995 |
| EP | 0635547 A3 | 1/1995 |
| EP | 0673971 A1 | 9/1995 |
| EP | 0681002 A2 | 11/1995 |
| EP | 1624025 A1 | 2/2006 |
| EP | 1627897 A1 | 2/2006 |
| WO | 92/14787 A1 | 9/1992 |
| WO | 94/24210 A1 | 10/1994 |
| WO | 99/03904 A1 | 1/1999 |
| WO | 0024828 A1 | 5/2000 |
| WO | 03042305 A1 | 5/2003 |
| WO | 2007024456 A1 | 3/2007 |
| WO | 2007032901 A1 | 3/2007 |
| WO | 2007037952 A1 | 4/2007 |

* cited by examiner

LOW GLOSS POLYCARBONATE COMPOSITIONS

BACKGROUND

This invention is directed to thermoplastic compositions comprising aromatic polycarbonate, their method of manufacture, and method of use thereof, and in particular impact-modified thermoplastic polycarbonate compositions having low gloss and a good balance of physical properties.

Thermoplastics having a low gloss finish are useful in the manufacture of articles and components for a wide range of applications, from automobile components, to decorative articles, to housings for electronic appliances, such as computers. A low gloss finish for a plastic article can be obtained using different methods. Mechanically texturing a plastic surface has long been used, but this type of surface finish is prone to wear and ultimately increases in gloss with use. Further, mechanical texturing adds processing steps and increases manufacturing costs. Modifications to the moldable thermoplastic composition itself is therefore desirable, whereupon an article can have a low gloss surface immediately after processes such as molding, casting, extruding, or rolling of a suitable low gloss composition. Excellent mechanical properties are also desired in a low gloss thermoplastic composition for use in these applications.

Polycarbonates, which have excellent mechanical properties, can be used in applications as described above. Low gloss finishes for polycarbonates can be attained by adding gloss-reducing fillers and additives such as particulate silica, or resins with gloss reducing functionality; however the usefulness of such blends can be mitigated by reduction in or loss of mechanical properties such as, for example, impact strength and ductility retention.

There accordingly remains a need in the art for low gloss thermoplastic compositions comprising polycarbonates, as well as impact modified polycarbonates.

Desirable features of such materials include both excellent mechanical properties and ease of manufacture. The mechanical properties of the low gloss thermoplastic composition are desirably comparable to, or better than, those of high gloss polycarbonate.

SUMMARY OF THE INVENTION

The above needs are met by a thermoplastic composition comprising polycarbonate, a polycarbonate-polysiloxane copolymer, an impact modifier composition comprising bulk ABS and a second impact modifier, an aromatic vinyl copolymer, and optionally a gel-type low gloss additive. In an embodiment, a thermoplastic composition comprises a polycarbonate, a polycarbonate-polysiloxane copolymer, an impact modifier composition comprising ABS or BABS, a second impact modifier different from BABS or ABS, an aromatic vinyl copolymer, and optionally a gel-type low gloss additive, wherein the 60° gloss of the thermoplastic composition is measured to be less than or equal to 14.0 GU on 3 millimeter chips having a textured surface when measured according to ASTM D2457, and wherein a molded sample of the thermoplastic composition has a low temperature notched Izod impact at −40° C. of at least 65 KJ/m² when measured according to ISO 180/1A.

In another embodiment, a thermoplastic composition comprises 50 to 87 wt. % of a polycarbonate, 2 to 10 wt. % of a polycarbonate-polysiloxane copolymer, 10 to 20 wt. % of an impact modifier composition comprising ABS or BABS, 2 to 10 wt. % of a second impact modifier different from BABS or ABS, 3 to 10 wt. % of an aromatic vinyl copolymer, and 0 to 1 wt. % of a gel-type low gloss additive, wherein the total amount of the aromatic vinyl copolymer and the gel-type low gloss additive is no more than 10 wt. %, wherein the 60° gloss of the thermoplastic composition is measured to be less than or equal to 14 GU on 3 millimeter chips having a textured surface when measured according to ASTM D2457, and wherein a molded sample of the thermoplastic composition has a low temperature notched Izod impact at −40° C. of at least 65 KJ/m² when measured according to ISO 180/1A.

In another embodiment, a thermoplastic composition comprises 50 to 87 wt. % of a polycarbonate, 2 to 10 wt. % of a polycarbonate-polysiloxane copolymer, 10 to 20 wt. % of an impact modifier composition comprising ABS or BABS, 2 to 10 wt. % of MBS, 3 to 10 wt. % of SAN, and 0 to 1 wt. % of a gel-type low gloss additive comprising SAN, wherein the total amount of the SAN and gel-type low gloss additive is no more than 10 wt. %, wherein the 60° gloss of the thermoplastic composition is measured to be less than or equal to 14 GU on 3 millimeter chips having a textured surface when measured according to ASTM D2457, and wherein a molded sample of the thermoplastic composition has a low temperature notched Izod impact at −40° C. of at least 65 KJ/m² when measured according to ISO 180/1A.

In another embodiment, an article comprises the above thermoplastic composition.

In still another embodiment, a method of manufacture of an article comprises molding, extruding, or shaping the above thermoplastic composition.

DETAILED DESCRIPTION OF THE INVENTION

Surprisingly, it has been found that a thermoplastic composition comprising a polycarbonate, a polycarbonate-polysiloxane copolymer, an impact modifier composition comprising a bulk ABS and a second impact modifier different from the bulk ABS, an aromatic vinyl copolymer, has excellent mechanical properties, in addition to suitable low gloss performance. The composition optionally comprises a gel-type low gloss additive. The improvement in gloss without significantly adversely affecting impact or other properties is particularly unexpected. It has further been discovered that an advantageous combination of other physical properties can be obtained.

In an embodiment, a thermoplastic composition comprises a polycarbonate, a polycarbonate-polysiloxane copolymer, an impact modifier composition comprising ABS or BABS, a second impact modifier different from BABS or ABS, an aromatic vinyl copolymer, and optionally a gel-type low gloss additive, wherein the 60° gloss of the thermoplastic composition is measured to be less than or equal to 14.0 GU on 3 millimeter chips having a textured surface when measured according to ASTM D2457, and wherein a molded sample of the thermoplastic composition has a low temperature notched Izod impact at −40° C. of at least 65 KJ/m² when measured according to ISO 180/1A.

In some embodiments, the 60° gloss of the thermoplastic composition is measured to be less than or equal to 12.0 GU on 3 millimeter chips having a textured surface when measured according to ASTM D2457. In other embodiments, a molded sample of the thermoplastic composition has a low temperature notched Izod impact at −40° C. of at least 70 KJ/m² when measured according to ISO 180/1A.

In another embodiment, a thermoplastic composition comprises 50 to 87 wt. % of a polycarbonate, 2 to 10 wt. % of a polycarbonate-polysiloxane copolymer, 10 to 20 wt. % of an impact modifier composition comprising ABS or BABS, 2 to 10 wt. % of a second impact modifier different from BABS or ABS, 3 to 10 wt. % of an aromatic vinyl copolymer, and 0 to 1 wt. % of a gel-type low gloss additive, wherein the total amount of the aromatic vinyl copolymer and the gel-type low gloss additive is no more than 10 wt. %, wherein the 60° gloss of the thermoplastic composition is measured to be less than or equal to 14 GU on 3 millimeter chips having a textured surface when measured according to ASTM D2457, and wherein a molded sample of the thermoplastic composition has a low temperature notched Izod impact at −40° C. of at least 65 KJ/m² when measured according to ISO 180/1A. In some embodiments, the composition comprises 5 to 10 wt. % polycarbonate-polysiloxane copolymer.

In another embodiment, a thermoplastic composition comprises 50 to 87 wt. % of a polycarbonate, 2 to 10 wt. % of a polycarbonate-polysiloxane copolymer, 10 to 20 wt. % of an impact modifier composition comprising ABS or BABS, 2 to 10 wt. % of MBS, 3 to 10 wt. % of SAN, and 0 to 1 wt. % of a gel-type low gloss additive comprising SAN, wherein the total amount of the SAN and gel-type low gloss additive is no more than 10 wt. %, wherein the 60° gloss of the thermoplastic composition is measured to be less than or equal to 14 GU on 3 millimeter chips having a textured surface when measured according to ASTM D2457, and wherein a molded sample of the thermoplastic composition has a low temperature notched Izod impact at −40° C. of at least 65 KJ/m² when measured according to ISO 180/1A.

In another embodiment, an article comprises the thermoplastic composition.

As used herein, GU refers to gloss units.

As used herein, the terms "polycarbonate" and "polycarbonate resin" means compositions having repeating structural carbonate units of formula (1):

in which at least about 60 percent of the total number of $R^1$ groups are aromatic organic radicals and the balance thereof are aliphatic, alicyclic, or aromatic radicals. In one embodiment each $R^1$ is an aromatic organic radical and, more specifically, a radical of formula (2):

$$-A^1-Y^1-A^2-\qquad(2)$$

wherein each of $A^1$ and $A^2$ is a monocyclic divalent aryl radical and $y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O₂)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH\qquad(3)$$

wherein $Y^1$, $A^1$ and $A^2$ are as described above. Also included are bisphenol compounds of general formula (4):

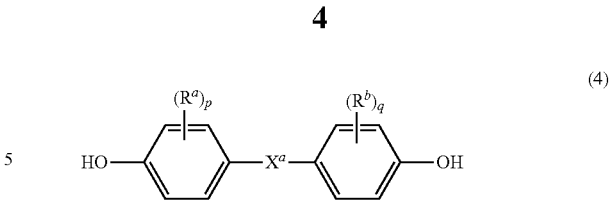

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, alkyl-substituted hydroquinone such as methylhydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like. Combinations comprising at least one of the foregoing dihydroxy compounds may also be used.

A nonexclusive list of specific examples of the types of bisphenol compounds that may be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxyphenyl-1-methylphenyl)propane, and 1,1-bis(4-hydroxy-t-butylphenyl)propane. Combinations comprising at least one of the foregoing bisphenol compounds may also be used.

Branched polycarbonates are also useful, as well as blends comprising a linear polycarbonate and a branched polycarbonate. The branched polycarbonates may be prepared by adding a branching agent during polymerization, for example a polyfunctional organic compound containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of about 0.05-2.0 wt. %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, and the like) or a glycol (e.g., the bishaloformate of ethylene glycol, neopentyl glycol, polyethylene glycol, and the like). Combinations comprising at least one of the foregoing types of carbonate precursors may also be used.

Among the exemplary phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-8}$ aryloxy group. Suitable phase transfer catalysts include, for example, $[CH_3(CH_2)_3]_4NX$, $[CH_3(CH_2)_3]_4PX$, $[CH_3(CH_2)_5]_4PX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$ wherein X is Cl$^-$, Br$^-$, a $C_{1-8}$ alkoxy group or $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. Volatile monohydric phenol is removed from the molten reactants by distillation and the polymer is isolated as a molten residue.

In one specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of about 0.3 to about 1.5 deciliters per gram (dl/gm), specifically about 0.45 to about 1.0 dl/gm. The polycarbonates may have a weight average molecular weight of about 10,000 to about 200,000, specifically about 20,000 to about 100,000 as measured by gel permeation chromatography. The polycarbonates are substantially free of impurities, residual acids, residual bases, and/or residual metals that may catalyze the hydrolysis of polycarbonate.

"Polycarbonate" and "polycarbonate resin" as used herein further includes copolymers comprising carbonate chain units together with a different type of chain unit. Such copolymers may be random copolymers, block copolymers, dendrimers and the like. One specific type of copolymer that may be used is a polyester carbonate, also known as a copolyester-polycarbonate. Such copolymers further contain, in addition to recurring carbonate chain units of the formula (1), repeating units of formula (6)

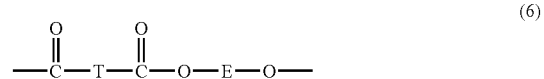

(6)

wherein E is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, E is a $C_{2-6}$ alkylene radical. In another embodiment, E is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is preferably bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, 2,4,5,6-tetrabromo resorcinol, and the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromo hydroquinone, and the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, E is a $C_{2-6}$ alkylene radical and T is p-phenylene, m-phenylene, naphthalene, a divalent cycloaliphatic radical, or a mixture thereof. This class of polyester includes the poly(alkylene terephthalates).

The copolyester-polycarbonate resins are also prepared by interfacial polymerization. Rather than using the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, and mixtures thereof, it is possible to employ isophthaloyl dichloride, terephthaloyl dichloride, and mixtures thereof. The copolyester-polycarbonate resins may have an intrinsic viscosity, as determined in chloroform at 25° C., of about 0.3 to about 1.5 deciliters per gram (dl/gm), specifically about 0.45 to about 1.0 dl/gm. The copolyester-polycarbonate resins may have a weight average molecular weight of about 10,000 to about 200,000, specifically about 20,000 to about 100,000 as measured by gel permeation chromatography. The copolyester-polycarbonate resins are substantially free of impurities, residual acids, residual bases, and/or residual metals that may catalyze the hydrolysis of polycarbonate.

The polycarbonate component may further comprise, in addition to the polycarbonates described above, combinations of the polycarbonates with other thermoplastic polymers, for example combinations of polycarbonate homopolymers and/or copolymers with polyesters and the like. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end-use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated herein are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 10 to about 99 wt. % polycarbonate and correspondingly about 1 to about 90 wt. % polyester, in particular a poly(alkylene terephthalate). In one embodiment, the blend comprises about 30 to about 70 wt. % polycarbonate and correspondingly about 30 to about 70 wt. % polyester. The foregoing amounts are based on the combined weight of the polycarbonate and polyester.

The thermoplastic composition further includes a combination of two or more impact modifiers, optionally two or more impact modifiers that do not catalyze hydrolytic degradation of polycarbonate. An impact modifier composition comprising bulk polymerized ABS and MBS, as described in U.S. Publication No. 2006-0004154-A1, would be an example of this combination of impact modifiers.

The bulk polymerized ABS comprises an elastomeric phase comprising (i) butadiene and having a Tg of less than about 10° C., and (ii) a rigid polymeric phase having a Tg of greater than about 15° C. and comprising a copolymer of a monovinylaromatic monomer such as styrene and an unsaturated nitrile such as acrylonitrile. Such ABS polymers may be prepared by first providing the elastomeric polymer, then polymerizing the constituent monomers of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Polybutadiene homopolymer may be used as the elastomer phase. Alternatively, the elastomer phase of the bulk polymerized ABS comprises butadiene copolymerized with up to about 25 wt. % of another conjugated diene monomer of formula (8):

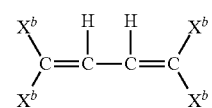

(8)

wherein each $X^b$ is independently $C_1$-$C_5$ alkyl. Examples of conjugated diene monomers that may be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. A specific conjugated diene is isoprene.

The elastomeric butadiene phase may additionally be copolymerized with up to 25 wt %, specifically up to about 15 wt. %, of another comonomer, for example monovinylaromatic monomers containing condensed aromatic ring structures such as vinyl naphthalene, vinyl anthracene and the like, or monomers of formula (9):

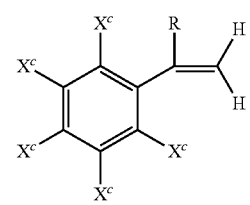

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In one embodiment, the butadiene is copolymerized with up to about 12 wt. %, specifically about 1 to about 10 wt. % styrene and/or alpha-methyl styrene.

Other monomers that may be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10):

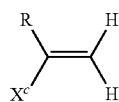

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and may be, for example about 0.01 to about 20 micrometers, specifically about 0.5 to about 10 micrometers, more specifically about 0.6 to about 1.5 micrometers may be used for bulk polymerized rubber substrates. Particle size may be measured by light transmission methods or capillary hydrodynamic chromatography (CHDF). The butadiene phase may provide about 5 to about 95 wt. % of the total weight of the ABS impact modifier copolymer, more specifically about 20 to about 90 wt. %, and even more specifically about 40 to about 85 wt. % of the ABS impact modifier, the remainder being the rigid graft phase.

The rigid graft phase comprises a copolymer formed from a styrenic monomer composition together with an unsaturated monomer comprising a nitrile group. As used herein, "styrenic monomer" includes monomers of formula (9) wherein each $X^c$ is independently hydrogen, $C_1$-$C_4$ alkyl, phenyl, $C_7$-$C_9$ aralkyl, $C_7$-$C_9$ alkaryl, $C_1$-$C_4$ alkoxy, phenoxy, chloro, bromo, or hydroxy, and R is hydrogen, $C_1$-$C_2$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like. Combinations comprising at least one of the foregoing styrenic monomers may be used.

Further as used herein, an unsaturated monomer comprising a nitrile group includes monomers of formula (10) wherein R is hydrogen, $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers may be used.

The rigid graft phase of the bulk polymerized ABS may further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10). Specific comonomers include $C_1$-$C_4$ alkyl(meth)acrylates, for example methyl methacrylate.

The rigid copolymer phase will generally comprise about 10 to about 99 wt. %, specifically about 40 to about 95 wt. %, more specifically about 50 to about 90 wt. % of the styrenic monomer; about 1 to about 90 wt. %, specifically about 10 to about 80 wt. %, more specifically about 10 to about 50 wt. % of the unsaturated monomer comprising a nitrile group; and 0 to about 25 wt. %, specifically 1 to about 15 wt. % of other comonomer, each based on the total weight of the rigid copolymer phase.

The bulk polymerized ABS copolymer may further comprise a separate matrix or continuous phase of ungrafted rigid copolymer that may be simultaneously obtained with the ABS. The ABS may comprise about 40 to about 95 wt. % elastomer-modified graft copolymer and about 5 to about 65 wt. % rigid copolymer, based on the total weight of the ABS. In another embodiment, the ABS may comprise about 50 to about 85 wt. %, more specifically about 75 to about 85 wt. % elastomer-modified graft copolymer, together with about 15 to about 50 wt. %, more specifically about 15 to about 25 wt. % rigid copolymer, based on the total weight of the ABS.

A variety of bulk polymerization methods for ABS-type resins are known. In multizone plug flow bulk processes, a series of polymerization vessels (or towers), consecutively connected to each other, providing multiple reaction zones. The elastomeric butadiene may be dissolved in one or more of the monomers used to form the rigid phase, and the elastomer solution is fed into the reaction system. During the reaction, which may be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating may be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/ disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product.

In addition to the bulk polymerized ABS, the impact modifier composition comprises an additional impact modifier that is different from the ABS. These impact modifiers that are different from the Bulk ABS include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (8) above wherein each $X^b$ is independently hydrogen, $C_1$-$C_5$ alkyl, and the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9) above, wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, combinations comprising at least one of the foregoing compounds, and the like. Styrene and/or alpha-methylstyrene are commonly used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10) wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl (meth)acrylate, n-butyl(meth)acrylate, t-butyl(meth)acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Certain (meth)acrylate monomers may also be used to provide the elastomer phase, including cross-linked, particulate emulsion homopolymers or copolymers of $C_{1-16}$ alkyl (meth)acrylates, specifically $C_{1-9}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-16}$ alkyl(meth) acrylate monomers may optionally be polymerized in admixture with up to 15 wt. % of comonomers of generic formulas (8), (9), or (10) as broadly described above. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. The elastomer phase may be a particulate, moderately cross-linked copolymer derived from conjugated butadiene or $C_{4-9}$ alkyl acrylate rubber, and preferably has a gel content greater than 70%. Also suitable are copolymers derived from mixtures of butadiene with styrene, acrylonitrile, and/or $C_{4-6}$ alkyl acrylate rubbers.

The elastomeric phase may provide about 5 to about 95 wt. % of the elastomer-modified graft copolymer, more specifically about 20 to about 90 wt. %, and even more specifically about 40 to about 85 wt. %, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above broadly described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, and the like, or combinations comprising at least one of the foregoing monovinylaromatic monomers. Suitable comonomers include, for example, the above broadly described monovinylic monomers and/or monomers of the general formula (10). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl(meth)acrylate, ethyl(meth)acrylate, n-propyl(meth)acrylate, iso-propyl(meth)acrylate, and the like, and combinations comprising at least one of the foregoing comonomers.

In one specific embodiment, the rigid graft phase is formed from styrene or alpha-methyl styrene copolymerized with ethyl acrylate and/or methyl methacrylate. In other specific embodiments, the rigid graft phase is formed from styrene copolymerized with; styrene copolymerized with methyl methacrylate; and styrene copolymerized with methyl methacrylate and acrylonitrile.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the additional elastomer-modified graft copolymer. Typically, such impact modifiers comprise about 40 to about 95 wt. % elastomer-modified graft copolymer and about 5 to about 65 wt. % rigid (co)polymer, based on the total weight of the impact modifier. In another embodiment, such impact modifiers comprise about 50 to about 85 wt. %, more specifically about 75 to about 85 wt. % rubber-modified rigid copolymer, together with about 15 to about 50 wt. %, more specifically about 15 to about 25 wt. % rigid (co)polymer, based on the total weight of the impact modifier.

Specific examples of elastomer-modified graft copolymers that differ from the bulk polymerized ABS include but are not limited to acrylonitrile-styrene-butyl acrylate (ASA), methyl methacrylate-acrylonitrile-butadiene-styrene (MABS), methyl methacrylate-butadiene-styrene (MBS), and acrylonitrile-ethylene-propylene-diene-styrene (AES). The MBS resins may be prepared by emulsion polymerization of methacrylate and styrene in the presence of polybutadiene as is described in U.S. Pat. No. 6,545,089, which process is summarized below.

Optionally, another specific type of elastomer-modified impact modifier may be used, which comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_9$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, and the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

In practice, any of the above described impact modifiers, or combinations of one or more of the foregoing impact modifiers, may be used. Processes for the formation of the elastomer-modified graft copolymers include mass, emulsion, suspension, and solution processes, or combined processes such as bulk-suspension, emulsion-bulk, bulk-solution or other techniques, using continuous, semibatch, or batch processes. Such processes may be conducted so as to avoid the use or production of any species that degrade polycarbonates, if desired, and/or to provide the additional impact modifiers with the desired pH.

In one embodiment, the impact modifier is prepared by an emulsion polymerization process that avoids the use or production of any species that degrade polycarbonates. In another embodiment the impact modifier is prepared by an emulsion polymerization process that is essentially free of basic species, for example species such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as polymerization aids, e.g., surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and combinations comprising at least one of the foregoing surfactants. A specific surfactant is a $C_{6-16}$, specifically a $C_{8-12}$ alkyl sulfonate. This emulsion polymerization process is known in the art and is described, for example, in U.S. Pat. No. 6,545,089.

The composition further comprises a polycarbonate-polysiloxane copolymer comprising polycarbonate blocks and polydiorganosiloxane blocks. The polycarbonate blocks in the copolymer comprise repeating structural units of formula (1) as described above, for example wherein $R_1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (11) (sometimes referred to herein as 'siloxane'):

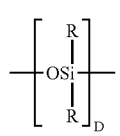

(11)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (11) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (12):

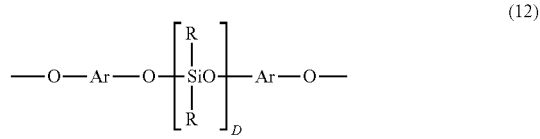

(12)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (12) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl) propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula:

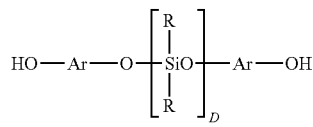

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (13)

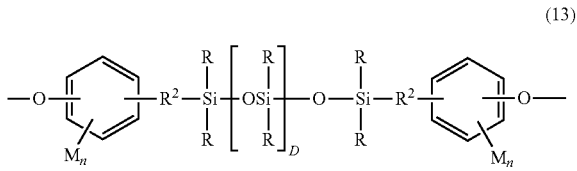

(13)

wherein R and D are as defined above. $R^2$ in formula (13) is a divalent $C_2$-$C_8$ aliphatic group. Each M in formula (13) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (14):

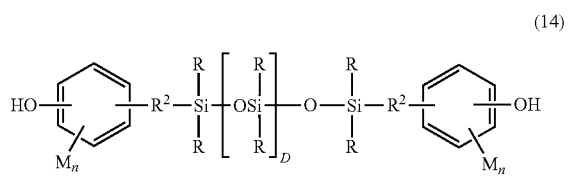

(14)

wherein R, D, M, $R^2$, and n are as described above.

Such dihydroxy polysiloxanes can be made by effecting a platinum catalyzed addition between a siloxane hydride of the formula (15),

(15)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (14) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, that is, may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The polycarbonate-polysiloxane copolymers have a weight-average molecular weight (MW, measured, for example, by gel permeation chromatography, ultra-centrifugation, or light scattering) of about 10,000 g/mol to about 200,000 g/mol, specifically about 20,000 g/mol to about 100,000 g/mol.

The composition further comprises an ungrafted rigid copolymer. In some embodiments, the rigid copolymer is an aromatic vinyl copolymer. The rigid copolymer is additional to any rigid copolymer present in the impact modifier. It may be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers of formula (9) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl(meth)acrylates, and monomers of the general formula (10) as broadly described above, for example acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise about 1 to about 99 wt. %, specifically about 20 to about 95 wt. %, more specifically about 40 to about 90 wt. % of vinylaromatic monomer, together with 1 to about 99 wt. %, specifically about 5 to about 80 wt. %, more specifically about 10 to about 60 wt. % of copolymerizable monovinylic monomers. In one embodiment the rigid copolymer is SAN, which may comprise about 50 to about 99 wt. % styrene, with the balance acrylonitrile, specifically about 60 to about 90 wt. % styrene, and more specifically about 65 to about 85 wt. % styrene, with the remainder acrylonitrile.

The rigid copolymer may be manufactured by bulk, suspension, or emulsion polymerization, and is substantially free of impurities, residual acids, residual bases or residual metals that may catalyze the hydrolysis of polycarbonate. In one embodiment, the rigid copolymer is manufactured by bulk polymerization using a boiling reactor. The rigid copolymer may have a weight average molecular weight of about 50,000 to about 300,000 as measured by GPC using polystyrene standards. In one embodiment, the weight average molecular weight of the rigid copolymer is about 50,000 to about 200,000.

In some embodiments, the thermoplastic composition further comprises a gel-type low gloss additive. An example of a suitable low gloss additive comprises the reaction product of a polyepoxide and a polymer comprising an ethylenically unsaturated nitrile, and can further comprise a non-reactive carrier, such as polycarbonate or polystyrene. The components are reactively combined at elevated temperature to form the low gloss additive. Suitable low gloss additives and methods of preparing them are known in the art, and are disclosed, for example, in U.S. Pat. Nos. 5,530,062; 5,336,701; 5,026,777; 5,580,924; and 5,965,665 which are incorporated herein by reference.

Polyepoxides which are suitable for use in preparing low gloss additives include simple aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl) adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil and soybean oil; combinations comprising one or more of the foregoing; and the like. Specifically suitable polyepoxides are alicyclic polyepoxides such as 3,4-epoxycyclohexyl 3,4-epoxycyclohexylcarboxylate, available under the trade name ERL-4221 from Dow or 2021-P from Daicel.

The gel-type low gloss additive, if present in the composition, is present in an amount of up to 5 wt. %, and the aromatic vinyl copolymer is present in an amount of from 1 wt. % to 45 wt. %. More optimally the gel-type low gloss additive is present in the composition in an amount of from 0 wt. % to 1 wt. % and the aromatic vinyl copolymer is present in the composition in an amount from 3 wt. % to 10 wt. % The total amount of the aromatic vinyl copolymer and gel-type low gloss additive in the composition is from 2 wt. % to 45 wt. %, specifically from 3 to 10 wt. %.

The relative amount of each component of the thermoplastic composition will depend on the particular type of polycarbonate(s) used, the presence of any other resins, and the particular impact modifier(s), including any optional rigid graft copolymer, as well as the desired properties of the composition. Particular amounts may be readily selected by one of ordinary skill in the art using the guidance provided herein.

In addition, the thermoplastic composition may include various additives such as fillers, reinforcing agents, stabilizers, and the like, with the proviso that the additives do not adversely affect the desired properties of the thermoplastic compositions.

Mixtures of additives may be used. Such additives may be mixed at a suitable time during the mixing of the components for forming the composition. Suitable fillers or reinforcing agents that may be used include, for example, silicates and silica powders such as aluminum silicate (mullite), synthetic calcium silicate, zirconium silicate, fused silica, crystalline silica graphite, natural silica sand, and the like; boron powders such as boron-nitride powder, boron-silicate powders, and the like; oxides such as $TiO_2$, aluminum oxide, magnesium oxide, and the like; calcium sulfate (as its anhydride, dihydrate or trihydrate); calcium carbonates such as chalk, limestone, marble, synthetic precipitated calcium carbonates, and the like; talc, including fibrous, modular, needle shaped, lamellar talc, and the like; wollastonite; surface-treated wollastonite; glass spheres such as hollow and solid glass spheres, silicate spheres, cenospheres, aluminosilicate (armospheres), and the like; kaolin, including hard kaolin, soft kaolin, calcined kaolin, kaolin comprising various coatings known in the art to facilitate compatibility with the polymeric matrix resin, and the like; single crystal fibers or "whiskers" such as silicon carbide, alumina, boron carbide, iron, nickel, copper, and the like; fibers (including continuous and chopped fibers) such as asbestos, carbon fibers, glass fibers, such as E, A, C, ECR, R, S, D, or NE glasses, and the like; sulfides such as molybdenum sulfide, zinc sulfide and the like; barium species such as barium titanate, barium ferrite, barium sulfate, heavy spar, and the like; metals and metal oxides such as particulate or fibrous aluminum, bronze, zinc, copper and nickel and the like; flaked fillers such as glass flakes, flaked silicon carbide, aluminum diboride, aluminum flakes, steel flakes and the like; fibrous fillers, for example short inorganic fibers such as those derived from blends comprising at least one of aluminum silicates, aluminum oxides, magnesium oxides, and calcium sulfate hemihydrate and the like; natural fillers and reinforcements, such as wood flour obtained by pulverizing wood, fibrous products such as cellulose, cotton, sisal, jute, starch, cork flour, lignin, ground nut shells, corn, rice grain husks and the like; organic fillers such as polytetrafluoroethylene (Teflon™) and the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) and the like; as well as additional fillers and reinforcing agents such as mica, clay, feldspar, flue dust, fillite, quartz, quartzite, perlite, tripoli, diatomaceous earth, carbon black, and the like, and combinations comprising at least one of the foregoing fillers and reinforcing agents. The fillers/reinforcing agents may be coated to prevent reactions with the matrix or may be chemically passivated to neutralize catalytic degradation site that might promote hydrolytic or thermal degradation.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber and the like. Fibrous fillers may be supplied in the form of, for example, rovings, woven fibrous reinforcements, such as 0-90 degree fabrics and the like; non-woven fibrous reinforcements such as continuous strand mat, chopped strand mat, tissues, papers and felts and the like; or three-dimensional reinforcements such as braids. Fillers are generally used in amounts of about 0 to about 150 parts by weight, based on 100 parts by weight of the thermoplastic composition.

Suitable antioxidant additives include, for example, alkylated monophenols or polyphenols; alkylated reaction products of polyphenols with dienes, such as tetrakis[methylene (3,5-di-tert-butyl-4-hydroxyhydrocinnamate)] methane, and the like; butylated reaction products of para-cresol or dicyclopentadiene; alkylated hydroquinones; hydroxylated thiodiphenyl ethers; alkylidene-bisphenols; benzyl species; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; and the like; and combinations comprising at least one of the foregoing antioxidants. Antioxidants are generally used in amounts of about 0.01 to about 1, specifically about 0.1 to about 0.5 parts by weight, based on 100 parts by weight of the thermoplastic composition.

Suitable heat and color stabilizer additives include, for example, organophosphites such as tris(2,4-di-tert-butyl phenyl)phosphite. Heat and color stabilizers are generally used in amounts of about 0.01 to about 5, specifically about 0.05 to about 0.3 parts by weight, based on 100 parts by weight of the thermoplastic composition.

Suitable secondary heat stabilizer additives include, for example thioethers and thioesters such as pentaerythritol tetrakis(3-(dodecylthio)propionate), pentaerythritol tetrakis [3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, dioctadecyl disulphide, and the like, and combinations comprising at least one of the foregoing heat stabilizers. Secondary stabilizers are generally used in amount of about 0.01 to about 5, specifically about 0.03 to about 0.3 parts by weight, based upon 100 parts by weight of the thermoplastic composition.

Light stabilizers, including ultraviolet light (UV) absorbing additives, may also be used. Suitable stabilizing additives of this type include, for example, benzotriazoles and hydroxybenzotriazoles such as 2-(2-hydroxy-5-methylphenyl)benzotriazole, 2-(2-hydroxy-5-tert-octylphenyl)-benzotriazole, 2-(2H-benzotriazol-2-yl)-4-(1,1,3,3-tetramethylbutyl)-phenol (CYASORB™ 5411 from Cytec), and TINUVIN™ 234 from Ciba Specialty Chemicals; hydroxybenzotriazines; hydroxyphenyl-triazine or -pyrimidine UV absorbers such as TINUVIN™ 1577 (Ciba), and 2-[4,6-bis (2,4-dimethylphenyl)-1,3,5-triazin-2-yl]-5-(octyloxy)-phenol (CYASORB™ 1164 from Cytec); non-basic hindered amine light stabilizers (hereinafter "HALS"), including substituted piperidine moieties and oligomers thereof, for example 4-piperidinol derivatives such as TINUVIN™ 622 (Ciba), GR-3034, TINUVIN™ 123, and TINUVIN™ 440; benzoxazinones, such as 2,2'-(1,4-phenylene)bis(4H-3,1-benzoxazin-4-one) (CYASORB™ UV-3638); hydroxybenzophenones such as 2-hydroxy-4-n-octyloxybenzophenone (CYASORB™ 531); oxanilides; cyanoacrylates such as 1,3-bis[(2-cyano-3,3-diphenylacryloyl)oxy]-2,2-bis [[(2-cyano-3,3-diphenylacryloyl)oxy]methyl]propane (UVINUL™ 3030) and 1,3-bis [(2-cyano-3,3-diphenylacryloyl)oxy]-2,2-bis [[(2-cyano-3,3-diphenylacryloyl)oxy]methyl]propane; and nano-size inorganic materials such as titanium oxide, cerium oxide, and zinc oxide, all with particle size less than about 100 nanometers; and the like, and combinations comprising at least one of the foregoing stabilizers. Light stabilizers may be used in amounts of about 0.01 to about 10, specifically about 0.1 to about 1 parts by weight, based on 100 parts by weight of parts by weight of the polycarbonate component and the impact modifier composition. UV absorbers are generally used in amounts of about 0.1 to about 5 parts by weight, based on 100 parts by weight of the thermoplastic composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax and the like; and poly alpha olefins such as Ethylflo 164, 166, 168, and 170. Such materials are generally used in amounts of about 0.1 to about 20 parts by weight, specifically about 1 to about 10 parts by weight, based on 100 parts by weight of the thermoplastic composition.

Colorants such as pigment and/or dye additives may also be present. Suitable pigments include for example, inorganic pigments such as metal oxides and mixed metal oxides such as zinc oxide, titanium dioxides, iron oxides and the like; sulfides such as zinc sulfides, and the like; aluminates; sodium sulfo-silicates sulfates, chomates, and the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, and combinations comprising at least one of the foregoing pigments. Pigments may be coated to prevent reactions with the matrix or may be chemically passivated to neutralize catalytic degradation site that might promote hydrolytic or thermal degradation. Pigments are generally used in amounts of about 0.01 to about 10 parts by weight, based on 100 parts by weight of the thermoplastic composition.

Suitable dyes are generally organic materials and include, for example, coumarin dyes such as coumarin 460 (blue), coumarin 6 (green), nile red and the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, and the like; luminescent dyes such as 5-amino-9-diethyliminobenzo(a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3- methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a) phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluoromethylpiperidino-<3,2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3'''',5''''-tetra-t-butyl-p-sexiphenyl; 3,5,3'''',5''''-tetra-t-butyl-p-quinquephenyl; 2,3,5,6-1H,4H-tetrahydro-9-acetylquinolizino-<9,9a, 1-gh>coumarin; 2,3,5,6-1H,4H-tetrahydro-9-carboethoxyquinolizino-<9,9a, 1-gh>coumarin; 2,3,5,6-1H,4H-tetrahydro-8-methylquinolizino-<9,9a, 1-gh>coumarin; 2,3,5,6-1H,4H-tetrahydro-9-(3-pyridyl)-quinolizino-<9,9a, 1-gh>coumarin; 2,3,5,6-1H, 4H-tetrahydro-8-trifluoromethylquinolizino-<9,9a, 1-gh>coumarin; 2,3,5,6-1H,4H-tetrahydroquinolizino-<9, 9a, 1-gh>coumarin; 3,3',2'',3'''-tetramethyl-p-quaterphenyl; 2,5,2'''',5''''-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene and the like, and combinations comprising at least one of the foregoing dyes. Dyes are generally used in amounts of about 0.1 parts per million to about 10 parts by weight, based on 100 parts by weight of the thermoplastic composition.

Monomeric, oligomeric, or polymeric antistatic additives that may be sprayed onto the article or processed into the thermoplastic composition may be advantageously used. Examples of monomeric antistatic agents include long chain esters such as glycerol monostearate, glycerol distearate, glycerol tristearate, and the like, sorbitan esters, and ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate and the like, fluorinated alkylsulfonate salts, betaines, and the like. Combinations of the foregoing antistatic agents may be used. Exemplary polymeric antistatic agents include certain polyetheresters, each containing polyalkylene glycol moieties such as polyethylene glycol, polypropylene glycol, polytetramethylene glycol, and the like. Such polymeric antistatic agents are commercially available, and include, for example PELESTAT™ 6321 (Sanyo), PEBAX™ MH1657 (Atofina), and IRGASTAT™ P18 and P22 (Ciba-Geigy). Other polymeric materials that may be used as antistatic agents are inherently conducting polymers such as polythiophene (commercially available from Bayer), which retains some of its intrinsic conductivity after melt processing at elevated temperatures. In one embodiment, carbon fibers, carbon nanofibers, carbon nanotubes, carbon black or any combination of the foregoing may be used in a polymeric resin containing chemical antistatic agents to render the composition electrostatically dissipative. Antistatic agents are generally used in amounts of about 0.1 to about 10 parts by weight, specifically about based on 100 parts by weight of the thermoplastic composition.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4'-oxybis(benzenesulfonylhydrazide), sodium bicarbonate, ammonium carbonate, and the like, or combinations comprising at least one of the foregoing blowing agents. Blowing agents are generally used in amounts of about 0.5 to about 20 parts by weight, based on 100 parts by weight of the thermoplastic composition.

Suitable flame retardant that may be added are stable, specifically hydrolytically stable. A hydrolytically stable flame retardant does not substantially degrade under conditions of manufacture and/or use to generate species that can catalyze or otherwise contribute to the degradation of the polycarbonate composition. Such flame retardants may be organic compounds that include phosphorus, bromine, and/or chlorine. The polysiloxane-polycarbonate copolymers described above may also be used. Non-brominated and nonchlorinated phosphorus-containing flame retardants may be preferred in certain applications for regulatory reasons, for example certain organic phosphates and/or organic compounds containing phosphorus-nitrogen bonds. Inorganic flame retardants, such as boric acid, boric oxide, or boric esters are also contemplated as effective flame retardants in these systems.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

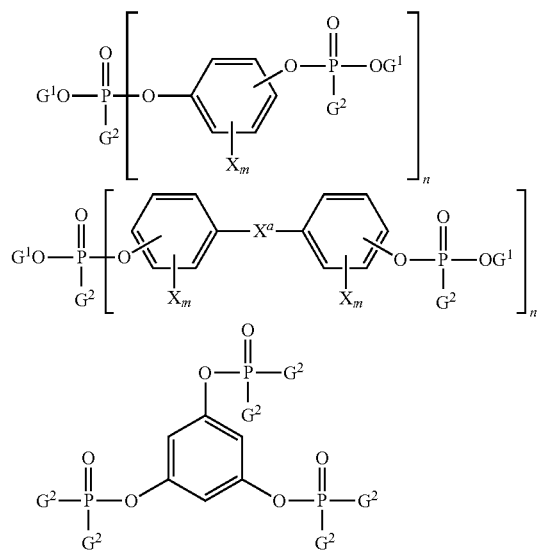

wherein each G' is independently a hydrocarbon having 1 to about 30 carbon atoms; each G2 is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride and tris(aziridinyl)phosphine oxide. When present, phosphorus-containing flame retardants are generally present in amounts of about 1 to about 20 parts by weight, based on 100 parts by weight of the thermoplastic composition.

Halogenated materials may also be used as flame retardants, for example halogenated compounds and resins of the formula (18):

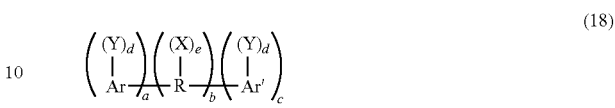

(18)

wherein R is an alkylene, alkylidene or cycloaliphatic linkage, such as methylene, propylene, isopropylidene, cyclohexylene, cyclopentylidene, and others; an oxygen ether, carbonyl, amine, or a sulfur containing linkage, such as, sulfide, sulfoxide, sulfone, and others; or two or more alkylene or alkylidene linkages connected by such groups as aromatic, amino, ether, carbonyl, sulfide, sulfoxide, sulfone, and other groups; Ar and Ar' are each independently a mono- or polycarbocyclic aromatic group such as phenylene, biphenylene, terphenylene, naphthylene, and others, wherein hydroxyl and Y substituents on Ar and Ar' can be varied in the ortho, meta or para positions on the aromatic rings and the groups can be in any possible geometric relationship with respect to one another; each Y is independently an organic, inorganic or organometallic radical, for example (1) a halogen such as chlorine, bromine, iodine, or fluorine, (2) an ether group of the general formula -OE, wherein E is a monovalent hydrocarbon radical similar to X, (3) monovalent hydrocarbon groups of the type represented by R or (4) other substituents, e.g., nitro, cyano, and the like, said substituents being essentially inert provided there be at least one and preferably two halogen atoms per aryl nucleus; each X is independently a monovalent $C_{1-18}$ hydrocarbon group such as methyl, propyl, isopropyl, decyl, phenyl, naphthyl, biphenyl, xylyl, tolyl, benzyl, ethylphenyl, cyclopentyl, cyclohexyl, and the like, each optionally containing inert substituents; each d is independently 1 to a maximum equivalent to the number of replaceable hydrogens substituted on the aromatic rings comprising Ar or Ar'; each e is independently 0 to a maximum equivalent to the number of replaceable hydrogens on R; and each a, b, and c is independently a whole number, including 0, with the proviso that when b is 0, either a or c, but not both, may be 0, and when b is not 0, neither a nor c may be 0.

Included within the scope of the above formula are bisphenols of which the following are representative: bis(2,6-dibromophenyl)methane; 1,1-bis-(4-iodophenyl)ethane; 2,6-bis(4,6-dichloronaphthyl)propane; 2,2-bis(2,6-dichlorophenyl)pentane; bis(4-hydroxy-2,6-dichloro-3-methoxyphenyl) methane; and 2,2-bis(3-bromo-4-hydroxyphenyl)propane. Also included within the above structural formula are 1,3-dichlorobenzene, 1,4-dibrombenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally used in amounts of about 1 to about 50 parts by weight, based on 100 parts by weight of the thermoplastic composition.

Another useful type of flame retardant is a polysiloxane-polycarbonate copolymer having polydiorganosiloxane blocks comprise repeating structural units of formula (13), previously described. D in formula (13) is selected so as to provide an effective level of flame retardance to the polycarbonate composition. The value of D will therefore vary depending on the relative amount of each component in the polycarbonate composition, including the amount of polycarbonate, impact modifier, polysiloxane-polycarbonate copolymer, and other flame retardants. Suitable values for D may be determined by one of ordinary skill in the art without undue experimentation using the guidelines taught herein. Generally, D has an average value of 10 to about 250, specifically about 10 to about 60.

In one embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1 \, to \, 8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Inorganic flame retardants may also be used, for example salts of $C_{1-16}$ alkyl sulfonates such as potassium perfluorobutane sulfonate (Rimar salt), potassium perfluorooctane sulfonate, tetraethylammonium perfluorohexane sulfonate, and potassium diphenylsulfone sulfonate; salts such as $CaCO_3$, $BaCO_3$, and $BaCO_3$; salts of fluoro-anion complex such as $Li_3AlF_6$, $BaSiF_6$, $KBF_4$, $K_3AlF_6$, $KAlF_4$, $K_2SiF_6$, and $Na_3AlF_6$; and the like. When present, inorganic flame retardant salts are generally present in amounts of about 0.01 to about 25 parts by weight, more specifically about 0.1 to about 10 parts by weight, based on 100 parts by weight of the thermoplastic composition.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 10 parts by weight, based on 100 parts by weight of the thermoplastic composition.

The thermoplastic compositions may be manufactured by methods generally available in the art, for example, in one embodiment, in one manner of proceeding, powdered polycarbonate, impact modifier composition, aromatic vinyl copolymer, gel-type gloss additive and/or other optional components are first blended, optionally with any fillers in a Henschel™ type high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Other processing methods, such as a single screw extruder, Buss™ kneader, Banbury™ mixer, and the like, may be used for processing, as known to a skilled artisan. Such additives may also be compounded into a masterbatch with a desired polymeric resin and fed into the extruder. The additives may be added to either the polycarbonate base materials or the impact modifier base material to make a concentrate, before this is added to the final product. The extruder is generally operated at a temperature higher than that necessary to cause the composition to flow, typically 500° F. (260° C.) to 650° F. (343° C.). The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, automobiles, trucks, recreational vehicles, trains, buses, lawn and garden equipment, furniture, and others.

The compositions find particular utility in automotive applications, for example interior parts such as instrument panels, overhead consoles, interior trim, center consoles, and other interior parts; and exterior parts such as body panels, exterior trim, bumpers, and others.

The compositions described herein may further have excellent physical properties and good processability. For example, the thermoplastic polycarbonate compositions may have a heat deflection temperature (HDT) of about 80 to about 120° C., more specifically about 90 to about 115° C., measured at 1.8 MPa, and about 100 to about 150° C., more specifically about 110 to about 135° C., measured at 0.45 MPa, on a 4 mm thick bar according to ISO 75Ae.

The thermoplastic polycarbonate compositions may further have a low temperature notched Izod Impact of greater than about 60 KJ/$m^2$, specifically greater than about 70 KJ/$m^2$, determined at −30° C. using a 4 mm thick bar per ISO 180/1A.

The thermoplastic polycarbonate compositions may further have a low temperature notched Izod Impact of greater than about 60 KJ/$m^2$, specifically greater than about 65 KJ/$m^2$, determined at −40° C. using a 4 mm thick bar per ISO 180/1A.

The thermoplastic polycarbonate compositions may further have a Charpy Impact of great than about 65 KJ/M2 determined at −30° C., more specifically great than about 75 KJ/m2, determined at −30° C., determined using a 4 mm thick per ISO 179/1eA.

The thermoplastic polycarbonate compositions may further have a Vicat B/50 of greater than about 100° C., more specifically greater than about 105° C., more specifically greater than about 110° C., determined using a 4 mm thick bar per ISO 306.

The thermoplastic polycarbonate compositions may further have a 60° Gloss of less than about 30 GU, specifically less than about 20 GU, more specifically less than about 14 GU, even more specifically less than about 12 GU, determined using a Gardner Gloss Meter and 3 millimeter color chips having a textured surface. A "textured surface", as used herein, means at least one of the commercially available textured surfaces, and specifically as measured on one or more of the commercially available textured surfaces, more specifically all of the commercial surfaces, including MT1055-2, MT11030, Rochester, Mont., N111, and N122.

The invention is further illustrated by the following non-limiting Examples, which were prepared from the components set forth in Table 1.

TABLE 1

| Component | Type | Source |
|---|---|---|
| PC-1 | BPA polycarbonate resin made by an interfacial process with a weight average molecular weight of about 22,000 on an absolute PC molecular weight scale | GE Plastics |
| PC-2 | BPA polycarbonate resin made by an interfacial process with a weight average molecular weight of about 30,000 on an absolute PC molecular weight scale | GE Plastics |
| MBS | Nominal 75-82 wt. % butadiene core with a balance of styrene-methyl methacrylate shell. (Trade name EXL 2691A) | Rohm & Haas |
| BABS | Bulk Acrylonitrile Butadiene Styrene with nominal 16% butadiene and content and nominal 15% acrylonitrile content, phase inverted with occluded SAN in a butadiene phase in SAN matrix | GE Plastics |
| SAN | Styrene acrylonitrile copolymer comprising 15-35 wt. % acrylonitrile (nominally 25 wt. %), bulk processed, weight average molecular weight of about 77,000 (Calibrated on Polystyrene standards based GPC weight average molecular weight) | GE Plastics |
| PC-Si | Polydimethylsiloxane - bisphenol A polycarbonate copolymer, 20 wt % polydimethylsiloxane content, Mw about 30,000 | GE Plastics |
| SAN-Gel | SAN-Gel gel-type additive having 50-60 wt. % SAN, 40-45 wt. % PC (as a carrier), 2-3 wt. % epoxy, and 0.05 to 0.1 wt. % organic acid as a catalyst. | GE Plastics |

In the examples below, the polycarbonates (PC) are based on Bisphenol A, and have a weight average molecular weight of 10,000 to 120,000, more specifically 18,000 to 40,000 (on an absolute molecular weight scale), available from GE Plastics under the trade name LEXAN®. The initial melt flow of the polycarbonates can range from about 2 to about 66 measured at 300° C. using a 1.2 Kg load, per ASTM D1238.

The MBS used in the examples is Rohm & Haas MBS EXL2691A (powder) having 75 to 82 wt. % butadiene core with a balance styrene-methyl methacrylate shell, but others, such as Rohm & Haas EXL3691A (pelletized) could also be used. The MBS is preferably manufactured in accordance with the process described U.S. Pat. No. 6,545,089, and is substantially free of impurities, residual acids, residual bases or residual metals that may catalyze the hydrolysis of polycarbonate. Control of the manufacture of the MBS to provide a slurry of the MBS having a pH of about 6 to about 7 provides optimal hydrolytic stability. The pH of a slurry of each of the components is measured using 1 g of the component and 10 mL of distilled water having a pH of 7 and containing a drop of isopropyl alcohol as a wetting agent.

The SAN used is a bulk process material having an acrylonitrile content of 25 wt. %, although SAN or other rigid polymers (vinyl aromatic polymers) having different amounts of acrylonitrile and made by either the bulk or suspension process could also be used.

The Bulk Acrylonitrile Butadiene Styrene (ABS, also referred to as bulk ABS or BABS) used has nominal 16% butadiene content and nominal 15% acrylonitrile content, phase inverted with occluded SAN in a butadiene phase in SAN matrix from GE Plastics, although ABS or other bulk ABS having different amounts of acrylonitrile and butadiene could also be used. In an exemplary embodiment, the ABS is manufactured in accordance with the process described U.S. Pat. No. 6,545,089, and is substantially free of impurities, residual acids, residual bases or residual metals that may catalyze the hydrolysis of polycarbonate. Control of the manufacture of the ABS to provide a slurry of the ABS having a pH of about 6 to about 7 provides optimal hydrolytic stability. The pH of a slurry of each of the components is measured using 1 g of the component and 10 mL of distilled water having a pH of 7 and containing a drop of isopropyl alcohol as a wetting agent.

The SAN-Gel used comprises the reaction product of a polyepoxide and a polymer comprising an ethylenically unsaturated nitrile (in a polycarbonate carrier) and was made according to the method of U.S. Pat. No. 5,530,062.

The polycarbonate-polysiloxane used is a copolymer of bisphenol A polycarbonate and polydimethylsiloxane having about 20% siloxane content, although other polycarbonate-polysiloxane copolymers having different siloxane content may also be used.

Samples were prepared by melt extrusion on a Werner & Pfleiderer 30 mm twin screw extruder, using a nominal melt temperature of 525° F. (274° C.), 25 inches (635 mm) of mercury vacuum, 80 to 95% torque, and 500 rpm. The extrudate was pelletized and dried at about 120° C. for about 4 hours. To make test specimens, the dried pellets were injection molded on an 85-ton injection molding machine at a nominal temp of 525° F. Specimens were tested in accordance with ASTM and/or ISO standards as described below.

Tensile properties such as Tensile Strength, Tensile Elongation to Break, Stress at Yield and Break and Chord Modulus were determined using 4 mm thick molded tensile bars tested per ISO 527 at 50 mm/min. It is also possible to measure at 5 mm/min. if desired for the specific application, but the samples measured in these experiments were measured at 50 mm/min. Tensile modulus is always measured at the start of the test with an initial rate of 1 mm/min, after which the test is continued at 50 mm/min. to measure the other tensile properties.

Flexural Modulus and Flexural Strength were determined using a 4 mm-thick bar cut from the tensile bar, pursuant to ISO 178.

Izod Impact Strength was measured according to ISO 180 ('NII') or ASTM D256 as indicated in the Tables. ISO 180 ('NII') is used to compare the impact resistances of plastic materials. ISO Izod Impact was determined using a 4 mm thick test sample cut from the tensile bars described above. It was determined per ISO 180/1A. The ISO designation reflects type of specimen and type of notch: ISO 180/1A means specimen type 1 and notch type A. The ISO results are defined as the impact energy in joules used to break the test specimen, divided by the specimen area at the notch. Results are reported in $kJ/m^2$. ASTM D256 is used to measure ASTM Izod Impact, which was determined using a molded Izod impact bar 3.2 mm thick, 12.5 mm wide, and 3 inches long. The samples were impacted with an impact energy of 5.5 J. Izod impact D/B refers to the ductile-brittle transition temperature, which is the temperature at which % ductility equals 50%.

Charpy Notched Impact ISO 179/1eA is used to compare the impact resistances of plastic materials. Charpy Notched Impact was determined using a 4 mm thick sample cut from the tensile bar previously described. The ISO results are defined as the impact energy in joules used to break the test specimen, divided by the specimen area at the notch. Results are reported in kJ/m². The samples were impacted with an impact energy of 15 J. Charpy D/B refers to the ductile-brittle transition temperature, which is the temperature at which % ductility equals 50%.

Vicat Softening Temperature (ISO 306) is a measure of the temperature at which a plastic starts to soften rapidly. A round, flat-ended needle of 1 mm² cross section penetrates the surface of a plastic test specimen under a predefined load, and the temperature is raised at a uniform rate. The Vicat softening temperature, or VST, is the temperature at which the penetration reaches 1 mm. ISO 306 describes two methods: Method A—load of 10 Newtons (N), and Method B—load of 50 N, with two possible rates of temperature rise: 50° C./hour (° C./h) or 120° C./h. This results in ISO values quoted as A/50, A/120, B/50 or B/120. The test assembly is immersed in a heating bath with a starting temperature of 23° C. After 5 minutes (min) the load is applied: 10 N or 50 N. The temperature of the bath at which the indenting tip has penetrated by 1±0.01 mm is reported as the VST of the material at the chosen load and temperature rise. These samples in these experiments were measured under condition B/50.

Heat Deflection Temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. Heat Deflection Test (HDT) was determined per ISO 75Af, using a flat, 4 mm thick bar cut from the Tensile bar and subjected to 1.8 MPa and 0.45 MPa, as specified in the Tables.

Melt Volume Rate (MVR) was determined at 260° C. using a 5-kilogram weight, with a six minute preheat, according to ASTM D1238. In some experiments, Melt Volume Rate was also determined with an eighteen minute preheat according to ASTM D1238. In other experiments, Melt Volume Rate was also measured at 265° C. with a four minute preheat according to ISO 1133. Melt Stability is a measure of the percent shift in Melt Volume Rate when going from a 6 minute preheat to an 18 minute preheat.

Low Shear Melt Viscosity is measured on a parallel plate Rheometrics rheometer at shear rates from 0.01 to 500 s$^{-1}$ (as listed in the Tables) at 15% strain and 260° C. Initial viscosity at 260° C. was measured using a Rheometrics parallel plate rheometer. Viscosity change is the difference between initial value at 6 minutes preheat and after 30 minutes heating under shear, using a Rheometrics parallel plate rheometer.

High Shear Melt Viscosity is measured on a capillary rheometer at 260° C. at shear rates from 100 to 10,000 s$^{-1}$ (as listed in the Tables) according to ISO 11443.

Dynatup Plaque Impact is measured on a plaque 3.2 mm thick, 10 centimeters diameter, a support ring of 3-inch diameter (7.5 cm), with a dart diameter of 12.5 mm at 6.6 m/s according to ASTM D376. Dynatup Energy to Maximum Load is the energy up to the peak load. Dynatup Energy Total (DYN Energy Total) is the total energy under the curve. Dynatup Max Load (DYN Max Load) is the maximum load attained by the specimen.

Percent ductility was determined on bars or plaques (for Izod and Dynatup ductility respectively) using a visual observation of the fractured specimen. Generally, significant stress whitening of the fractured surface accompanied by gross deformation at the fractured tip indicates a ductile failure mode; conversely, lack of significant stress whitening of the fractured surface and lack of gross deformation at the fractured tip indicates brittle failure mode. All bar samples or plaque samples broken into two or more pieces are defined as brittle failures. All bar samples that still remain in one piece, but in which the two halves are hinged together by a thin film of polymer (also referred to as hinged breaks) are by defined as brittle failures. Plaque samples with a crack that extends to the support ring are classified as ductile if the plaque remains in one piece and gross deformation is observed. Ten bars or plaques were tested, and percent ductility is expressed as a percentage of impact bars/plaques that exhibited ductile failure mode. Ductility tends to decrease with decreasing temperature, and the ductile transition temperature is the temperature at which % ductility equals 50%.

Surface gloss was tested according to ASTM D2457 at 20°, and 60° and ASTM D523 at 85° using a Gardner Gloss Meter and 3 millimeter color chips and is reported in gloss units (GU) with the gloss level of standard black glass chip as 100 GU. The surface textures used are commercially available standard surfaces.

Examples 1 to 36 were produced at various levels of components from Table 1. The formulations used are shown in Table 2 below. All amounts are in weight percent (wt. %).

TABLE 2

| Ex. No. | PC-1 wt. % | PC-2 wt. % | BABS wt. % | SAN wt. % | SAN-Gel wt. % | Total SAN wt. % | MBS wt. % | PC-Si wt. % |
|---|---|---|---|---|---|---|---|---|
| 1 | 62.00 | 0.00 | 10.00 | 3.33 | 1.67 | 5.00 | 13.00 | 10.00 |
| 2 | 16.75 | 50.25 | 12.50 | 6.56 | 0.94 | 7.50 | 8.00 | 5.00 |
| 3 | 0.00 | 62.00 | 10.00 | 10.00 | 5.00 | 15.00 | 3.00 | 10.00 |
| 4 | 62.00 | 0.00 | 20.00 | 5.00 | 0.00 | 5.00 | 3.00 | 10.00 |
| 5 | 43.44 | 26.06 | 15.00 | 6.56 | 0.94 | 7.50 | 5.50 | 2.50 |
| 6 | 0.00 | 62.00 | 10.00 | 15.00 | 0.00 | 15.00 | 3.00 | 10.00 |
| 7 | 0.00 | 62.00 | 20.00 | 5.00 | 0.00 | 5.00 | 3.00 | 10.00 |
| 8 | 48.38 | 16.13 | 15.00 | 6.25 | 1.25 | 7.50 | 5.50 | 7.50 |
| 9 | 0.00 | 72.00 | 10.00 | 3.33 | 1.67 | 5.00 | 3.00 | 10.00 |
| 10 | 0.00 | 62.00 | 10.00 | 5.00 | 0.00 | 5.00 | 13.00 | 10.00 |
| 11 | 0.00 | 62.00 | 10.00 | 5.00 | 0.00 | 5.00 | 13.00 | 10.00 |
| 12 | 20.96 | 43.54 | 12.50 | 6.25 | 1.25 | 7.50 | 5.50 | 10.00 |
| 13 | 22.59 | 46.91 | 12.50 | 6.25 | 1.25 | 7.50 | 5.50 | 5.00 |
| 14 | 0.00 | 72.00 | 10.00 | 5.00 | 0.00 | 5.00 | 3.00 | 10.00 |
| 15 | 0.00 | 62.00 | 20.00 | 3.33 | 1.67 | 5.00 | 3.00 | 10.00 |
| 16 | 22.59 | 46.91 | 12.50 | 6.25 | 1.25 | 7.50 | 5.50 | 5.00 |
| 17 | 22.59 | 46.91 | 12.50 | 6.25 | 1.25 | 7.50 | 5.50 | 5.00 |
| 18 | 0.00 | 62.00 | 10.00 | 3.33 | 1.67 | 5.00 | 13.00 | 10.00 |
| 19 | 62.00 | 0.00 | 10.00 | 10.00 | 5.00 | 15.00 | 3.00 | 10.00 |
| 20 | 20.96 | 43.54 | 12.50 | 6.25 | 1.25 | 7.50 | 5.50 | 10.00 |
| 21 | 72.00 | 0.00 | 20.00 | 3.33 | 1.67 | 5.00 | 3.00 | 0.00 |
| 22 | 32.25 | 32.25 | 17.50 | 7.50 | 2.50 | 10.00 | 8.00 | 0.00 |
| 23 | 0.00 | 72.00 | 20.00 | 3.33 | 1.67 | 5.00 | 3.00 | 0.00 |
| 24 | 72.00 | 0.00 | 10.00 | 10.00 | 5.00 | 15.00 | 3.00 | 0.00 |
| 25 | 32.25 | 32.25 | 17.50 | 7.50 | 2.50 | 10.00 | 8.00 | 0.00 |
| 26 | 72.00 | 0.00 | 10.00 | 5.00 | 0.00 | 5.00 | 13.00 | 0.00 |
| 27 | 40.31 | 24.19 | 17.50 | 7.50 | 2.50 | 10.00 | 8.00 | 0.00 |
| 28 | 32.25 | 32.25 | 17.50 | 7.50 | 2.50 | 10.00 | 8.00 | 0.00 |
| 29 | 62.00 | 0.00 | 20.00 | 5.00 | 0.00 | 5.00 | 13.00 | 0.00 |
| 30 | 62.00 | 0.00 | 20.00 | 10.00 | 5.00 | 15.00 | 3.00 | 0.00 |
| 31 | 72.00 | 0.00 | 10.00 | 15.00 | 0.00 | 15.00 | 3.00 | 0.00 |
| 32 | 0.00 | 62.00 | 10.00 | 5.00 | 0.00 | 5.00 | 13.00 | 0.00 |
| 33 | 33.50 | 33.50 | 15.00 | 7.50 | 2.50 | 10.00 | 8.00 | 0.00 |
| 34 | 62.00 | 0.00 | 10.00 | 15.00 | 0.00 | 15.00 | 13.00 | 0.00 |

TABLE 2-continued

| Ex. No. | PC-1 wt. % | PC-2 wt. % | BABS wt. % | SAN wt. % | SAN-Gel wt. % | Total SAN wt. % | MBS wt. % | PC-Si wt. % |
|---|---|---|---|---|---|---|---|---|
| 35 | 0.00 | 62.00 | 20.00 | 5.00 | 0.00 | 5.00 | 13.00 | 0.00 |
| 36 | 62.00 | 0.00 | 10.00 | 10.00 | 5.00 | 15.00 | 13.00 | 0.00 |

All of the above samples contained a stabilization package and color concentrate package. The color concentrate package was included in the stabilization package, and the stabilization package was added to the samples. The stabilization package contained 0.4 mold release agent; 0.5 primary hindered phenol antioxidant; 0.2 thioester secondary stabilizer; 0.1 phosphite secondary stabilizer; 0.3 UV stabilizer; 1.59 $TiO_2$; and 0.93 color concentrate package (all in parts per hundred (phr) polymer). The color concentrate package contained: 36.5 g carbon black; 2.5 g sol red 135; 202 g pigment yellow 183; 188 g pigment green 50; 71 g pigment blue 29; 2400 g PC powder (high flow PC, MW 22,000).

The samples from Table 2 were then tested according to the test methods described above. Results of the tests are shown in Tables 3 to 9 below.

TABLE 3

| Ex. No. | Charpy Impact Strength 23° C. kJ/m² | Charpy Impact Strength −30° C. kJ/m² | Charpy Impact Strength −40° C. kJ/m² | ISO Flexural Modulus MPa | ISO Flexural Strength MPa | ISO HDT @ 1.8 MPa, flat ° C. | ISO HDT @ 0.45 MPa, flat ° C. | ISO Impact Strength, 23° C. kJ/m² |
|---|---|---|---|---|---|---|---|---|
| 1 | 53.3 | 48.0 | 42.2 | 1862 | 66.7 | 99.5 | 123.7 | 45.5 |
| 2 | 83.7 | 65.4 | 57.0 | 2110 | 76.4 | 104.2 | 125.8 | 65.8 |
| 3 | 68.1 | 49.5 | 30.8 | 2318 | 84.8 | 104 | 125.9 | 62.3 |
| 4 | 64.7 | 44.4 | 38.5 | 2182 | 77.2 | 101.7 | 122.8 | 61.6 |
| 5 | 66.8 | 41.2 | 36.9 | 2244 | 78.7 | 103.1 | 125.6 | 58.0 |
| 6 | 100.1 | 48.1 | 35.6 | 2276 | 85.9 | 103.7 | 125.4 | 97.1 |
| 7 | 137.6 | 84.9 | 85.0 | 2110 | 79.7 | 103.9 | 125.6 | 104.9 |
| 8 | 70.2 | 44.7 | 42.1 | 2067 | 77.1 | 103.9 | 124.7 | 62.1 |
| 9 | 97.9 | 66.9 | 61.0 | 2147 | 82.5 | 111.6 | 129.6 | 75.3 |
| 10 | 94.6 | 93.2 | 93.6 | 1807 | 69.2 | 105.1 | 127.8 | 66.6 |
| 11 | 90.6 | 82.1 | 105.4 | 1836 | 69.1 | 104.2 | 126.4 | 64.9 |
| 12 | 106.7 | 68.5 | 62.3 | 2089 | 78.2 | 105.1 | 125.7 | 81.9 |
| 13 | 83.0 | 53.4 | 53.9 | 2134 | 80.1 | 106.2 | 126.9 | 72.7 |
| 14 | 129.7 | 83.7 | 85.3 | 2172 | 83.9 | 111.5 | 128.9 | 87.7 |
| 15 | 124.8 | 59.3 | 76.1 | 2130 | 79.4 | 104.9 | 125.3 | 93.6 |
| 16 | 80.7 | 53.4 | 57.8 | 2138 | 79.8 | 106.9 | 127.0 | 70.8 |
| 17 | 79.3 | 53.3 | 57.8 | 2135 | 80.2 | 106.4 | 126 | 70.0 |
| 18 | 72.6 | 63.2 | 61.6 | 1846 | 67.7 | 105.3 | 126.5 | 59.6 |
| 19 | 45.9 | 16.1 | 16.8 | 2127 | 79.2 | 104.1 | 124 | 43.9 |
| 20 | 130.2 | 72.6 | 81.2 | 2051 | 78.4 | 106.3 | 126.7 | 84.8 |
| 21 | 51.9 | 19.4 | 18.5 | 2301 | 82.3 | 103.1 | 124.3 | 41.3 |
| 22 | 64.8 | 38.0 | 28.4 | 2166 | 76.9 | 100.6 | 123.9 | 57.1 |
| 23 | 84.2 | 50.6 | 54.8 | 2320 | 83.0 | 105 | 127.6 | 64.5 |
| 24 | 34.7 | 12.0 | 13.8 | 2402 | 90.1 | 104.6 | 125 | 21.1 |
| 25 | 62.9 | 41.4 | 40.0 | 2065 | 76.9 | 100.9 | 123.5 | 57.3 |
| 26 | 51.2 | 41.8 | 42.5 | 1888 | 71.4 | 104.4 | 127.2 | 40.5 |
| 27 | 60.1 | 38.6 | 25.0 | 2077 | 75.3 | 101.1 | 123.4 | 54.4 |
| 28 | 65.2 | 48.0 | 43.9 | 2179 | 76.5 | 101.3 | 123.5 | 57.1 |
| 29 | 50.4 | 45.9 | 34.5 | 1870 | 68.6 | 96.4 | 120 | 39.2 |
| 30 | 29.5 | 11.9 | 11.1 | 2331 | 83.9 | 98.3 | 121 | 24.6 |
| 31 | 42.7 | 17.6 | 13.0 | 2412 | 89.7 | 104.3 | 124.6 | 36.8 |
| 32 | 74.8 | 53.2 | 54.0 | 1991 | 74.4 | 100.8 | 124.1 | 67.5 |
| 33 | 66.0 | 45.3 | 46.0 | 2105 | 78.2 | 102.1 | 124 | 63.1 |
| 34 | 60.2 | 27.3 | 23.4 | 2001 | 74.2 | 97.6 | 121 | 42.1 |
| 35 | 168.5 | 158.9 | 168.1 | 1807 | 68.5 | 100.2 | 123.2 | 91.5 |
| 36 | 53.1 | 21.44 | NA | 2046 | 76.6 | 100.9 | 122.4 | 46.8 |

TABLE 4

| Ex. No. | ISO Impact Strength −30° C. kJ/m² | ISO Impact Strength −40° C. kJ/m² | ISO Ductility −40° C. % | Izod D/B Trans. Temp. ° C. | DYN Energy to Max Load 23° C. J | DYN Total Energy 23° C. J | DYN Max Load 23° C. kN | DYN Energy to Max Load −30° C. J |
|---|---|---|---|---|---|---|---|---|
| 1 | 37.9 | 37.0 | 100 | −55 | 42.2 | 49.6 | 4.533 | 46 |
| 2 | 53.8 | 47.0 | 100 | −56 | 40.4 | 49.6 | 4.557 | 52.4 |
| 3 | 43 | 34.0** | 11.1** | −45 | 48.6 | 53.6 | 4.984 | 53.7 |
| 4 | 44.7 | 40.0 | 100 | −55 | 43 | 52.7 | 4.579 | 52.2 |
| 5 | 40.4 | 36.3 | 20 | −46 | 41.4 | 50.6 | 4.628 | 50.7 |
| 6 | 56.2 | 45.6 | 90 | −52 | 49.5 | 57.9 | 4.982 | 55.8 |
| 7 | 76.2 | 69.5 | 100 | −70 | 47.5 | 53.8 | 4.749 | 52.1 |
| 8 | 41.2 | 39.7 | 100 | −55 | 43.3 | 53.2 | 4.624 | 48.6 |

TABLE 4-continued

| Ex. No. | ISO Impact Strength -30° C. kJ/m² | ISO Impact Strength -40° C. kJ/m² | ISO Ductility -40° C. % | Izod D/B Trans. Temp. ° C. | DYN Energy to Max Load 23° C. J | DYN Total Energy 23° C. J | DYN Max Load 23° C. kN | DYN Energy to Max Load -30° C. J |
|---|---|---|---|---|---|---|---|---|
| 9 | 62.6 | 56.3 | 100 | -60 | 48.5 | 55.1 | 4.997 | 52.6 |
| 10 | 62.8 | 66.1 | 100 | -65 | 42.5 | 47.5 | 4.356 | 48.1 |
| 11 | 69.5 | 68.8 | 100 | -70 | 48.6 | 55 | 4.769 | 49.9 |
| 12 | 58.0 | 54.6 | 100 | -60 | 51.6 | 46.3 | 4.402 | 48.9 |
| 13 | 51.3 | 47.2 | 100 | -55 | 51.6 | 57.2 | 4.983 | 63.4 |
| 14 | 76.3 | 75.8 | 100 | -70 | 52.7 | 57 | 5.253 | 64.5 |
| 15 | 64.6 | 57.0 | 60 | -51 | 52.7 | 58.6 | 5.134 | 57.8 |
| 16 | 49.1 | 49.2 | 100 | -56 | 53 | 59.5 | 5.249 | 55.4 |
| 17 | 50.5 | 40.0 | 80 | -54 | 48.2 | 54.8 | 5.019 | 57.4 |
| 18 | 55.0 | 55.4 | 100 | -65 | 45.4 | 49.3 | 4.532 | 47.3 |
| 19 | 15.6 | 14.1 | 0 | 15 | 43.7 | 49.2 | 4.892 | 34.4 |
| 20 | 71.2 | 63.9 | 100 | -60 | 47.9 | 53.9 | 5.132 | 51.7 |
| 21 | 14.3 | 13.7 | 0 | 15 | 40.2 | 47 | 4.576 | 37.9 |
| 22 | 36.4 | 28.0 | 50 | -50 | 47.1 | 54.2 | 4.711 | 49.6 |
| 23 | 50.1 | 47.0 | 100 | -55 | 48 | 55.4 | 5.086 | 44.2 |
| 24 | 6.6 | 7.2 | 0 | 20 | 40.7 | 48.8 | 4.842 | 30.4 |
| 25 | 38.4 | 34.7 | 80 | -51 | 46.7 | 53.4 | 4.743 | 49.7 |
| 26 | 37.0 | 36.5 | 100 | -55 | 40.6 | 47.4 | 4.506 | 42.6 |
| 27 | 35.3 | 29.7 | 50 | -50 | 43.6 | 51.2 | 4.595 | 49.1 |
| 28 | 39.4 | 36.0 | 100 | -52 | 41.4 | 51.6 | 4.524 | 49 |
| 29 | 34.4 | 38.0 | 50 | -50 | 45.1 | 51.9 | 4.393 | 42.1 |
| 30 | 9.9 | 8.7 | 0 | 20 | 44.7 | 54.1 | 5.184 | 45.6 |
| 31 | 12.5 | 13.7 | 0 | 10 | 48.4 | 59.3 | 5.344 | 54.2 |
| 32 | 49.9 | 40.2 | 100 | -55 | 48.2 | 52.7 | 4.76 | 49.5 |
| 33 | 40.2 | 30.7 | 90 | -54 | 49.6 | 56.2 | 4.886 | 53.6 |
| 34 | 35.7 | 28.4 | 40 | -48 | 37.2 | 44.8 | 4.341 | 48.4 |
| 35 | 112.6 | 102.1 | 100 | -70 | 48.2 | 54.5 | 4.684 | 50.1 |
| 36 | 22.0 | 16.5 | 0 | -46 | 42.4 | 48.3 | 4.715 | 35.5 |

**One sample was lost, therefore this result is based on 9 samples

TABLE 5

| Ex. No. | DYN Total Energy -30° C. J | DYN Max Load -30° C. kN | DYN Ductility -30° C. % | DYN Energy to Max Load -40° C. J | DYN Total Energy -40° C. J | DYN Max Load -40° C. kN | DYN Ductility -40° C. % | ASTM MVR 260° C., 5 Kg cm³/100 min |
|---|---|---|---|---|---|---|---|---|
| 1 | 53.4 | 5.673 | 100 | 43.6 | 60.5 | 4.434 | 100 | 18.5 |
| 2 | 61.3 | 6.123 | 100 | 53.2 | 60 | 5.976 | 100 | 12.3 |
| 3 | 58.8 | 6.258 | 0 | 53.7 | 58.4 | 6.093 | 0 | 11.8 |
| 4 | 58.7 | 5.916 | 0 | 35.3 | 41.3 | 5.12 | 0 | 32.1 |
| 5 | 57.5 | 5.942 | 0 | 52.1 | 58.1 | 6.06 | 0 | 21.6 |
| 6 | 62.5 | 6.278 | 0 | 57.6 | 62.8 | 6.351 | 0 | 15.2 |
| 7 | 60.1 | 5.872 | 0 | 50.6 | 56.1 | 5.861 | 100 | 11 |
| 8 | 56.1 | 5.662 | 0 | 41.5 | 50.7 | 5.541 | 100 | 27.7 |
| 9 | 59.6 | 6.115 | 100 | 51.9 | 56.4 | 5.63 | 100 | 22.2 |
| 10 | 52.3 | 5.428 | 100 | 44.6 | 48.7 | 5.446 | 100 | 22.6 |
| 11 | 60.2 | 5.728 | 100 | 52 | 58.3 | 5.999 | 100 | 6.67 |
| 12 | 56.4 | 5.579 | 100 | 55.9 | 62.6 | 6.479 | 20 | 13.3 |
| 13 | 68.6 | 6.451 | 100 | 63.7 | 68.1 | 6.7 | 0 | 14 |
| 14 | 71.7 | 6.915 | 100 | 66.4 | 73 | 7.199 | 100 | 9.01 |
| 15 | 64.3 | 6.337 | 80 | 59.5 | 66.1 | 6.669 | 0 | 10.1 |
| 16 | 63.7 | 6.376 | 100 | 57 | 67.3 | 6.888 | 0 | 14 |
| 17 | 65.1 | 6.393 | 20 | 56.3 | 67.6 | 6.883 | 0 | 13.7 |
| 18 | 54 | 5.625 | 100 | 45.5 | 53.7 | 5.876 | 100 | 5.75 |
| 19 | 38.4 | 5.402 | 0 | 34 | 39.2 | 5.352 | 0 | 32.4 |
| 20 | 58.5 | 6.201 | 100 | 54.6 | 63.3 | 6.669 | 40 | 12.5 |
| 21 | 41.1 | 4.125 | 0 | 34.1 | 53.6 | 4.557 | 0 | 37.6 |
| 22 | 55.9 | 5.851 | 0 | 46.1 | 51.5 | 5.22 | 0 | 19.5 |
| 23 | 51.3 | 5.224 | 20 | 57.7 | 64.8 | 6.385 | 0 | 11.4 |
| 24 | 35 | 4.359 | 0 | 35.7 | 38.9 | 5.671 | 0 | 43 |
| 25 | 57.2 | 5.74 | 33.3 | 46.5 | 54 | 5.546 | 0 | 22 |
| 26 | 49.8 | 5.381 | 0 | 40.1 | 46.4 | 5.356 | 100 | 7.95 |
| 27 | 54.1 | 5.646 | 100 | 40.8 | 48.1 | 5.672 | 100 | 5.97 |
| 28 | 54.7 | 5.659 | 0 | 47.8 | 53.5 | 5.763 | 0 | 18.8 |
| 29 | 47.5 | 5.317 | 40 | 47.3 | 53.3 | 5.778 | 0 | 28.8 |
| 30 | 52.3 | 6.29 | 0 | 31.4 | 34.7 | 5.48 | 0 | 46.7 |
| 31 | 63.1 | 6.758 | 0 | 40.6 | 44.5 | 5.091 | 0 | 54.1 |

TABLE 5-continued

| Ex. No. | DYN Total Energy −30° C. J | DYN Max Load −30° C. kN | DYN Ductility −30° C. % | DYN Energy to Max Load −40° C. J | DYN Total Energy −40° C. J | DYN Max Load −40° C. kN | DYN Ductility −40° C. % | ASTM MVR 260° C., 5 Kg cm³/100 min |
|---|---|---|---|---|---|---|---|---|
| 32 | 57.9 | 5.97 | 0 | 46.4 | 58.1 | 5.85 | 0 | 10.9 |
| 33 | 62 | 6.17 | 0 | 56.8 | 64.8 | 6.659 | 0 | 18.2 |
| 34 | 54.6 | 5.736 | 0 | 42.5 | 46.7 | 5.593 | 0 | 39.1 |
| 35 | 57.3 | 5.63 | 60 | 46 | 53.3 | 5.816 | 0 | 8.82 |
| 36 | 41 | 5.468 | 0 | 38.9 | 42.4 | 5.307 | 0 | 34.2 |

TABLE 6

| Ex. No. | ASTM MVR 260° C., 18 min, 5 Kg cm³/10 min | Melt Stability (6 min–18 min) % | ISO MVR 265° C., 5 Kg cm³/10 min | ISO Tensile Chord Modulus MPa | ISO Tensile Yield Stress MPa | ISO Tensile Break Stress MPa | ISO Tensile Yield Strain % | ISO Tensile Elong. % |
|---|---|---|---|---|---|---|---|---|
| 1 | 19.7 | 6.5 | 22.7 | 2157 | 41.3 | 44.2 | 4.06 | 110 |
| 2 | 13 | 5.7 | 14.6 | 2197 | 47.6 | 52.6 | 4.32 | 120 |
| 3 | 12.7 | 7.6 | 13.8 | 2527 | 54.1 | 56.6 | 4.26 | 120 |
| 4 | 33.4 | 4.0 | 38.8 | 2413 | 47.5 | 51.0 | 3.89 | 120 |
| 5 | 22.2 | 2.8 | 25.9 | 2299 | 48.9 | 52.0 | 4.23 | 120 |
| 6 | 15.4 | 1.3 | 17.9 | 2914 | 53.5 | 57.6 | 4.16 | 120 |
| 7 | 10.9 | −0.9 | 12.7 | 2296 | 49.2 | 55.7 | 4.25 | 130 |
| 8 | 27.3 | −1.4 | 32.5 | 2296 | 47.7 | 46.9 | 4.12 | 100 |
| 9 | 21.8 | −1.8 | 28.5 | 2354 | 52.9 | 58.2 | 4.68 | 120 |
| 10 | 23.2 | 2.7 | 27.6 | 1910 | 42.9 | 49.7 | 4.53 | 120 |
| 11 | 9.24 | 38.5 | 7.9 | 2070 | 43.9 | 49.4 | 4.39 | 110 |
| 12 | 17.6 | 32.3 | 15.8 | 2530 | 49.5 | 51.6 | 4.19 | 110 |
| 13 | 18.7 | 33.6 | 16.6 | 2232 | 50.5 | 54.9 | 4.37 | 120 |
| 14 | 11.7 | 29.9 | 10.4 | 2377 | 53.3 | 59.4 | 4.65 | 120 |
| 15 | 13.2 | 30.7 | 11.8 | 2317 | 49.9 | 55.4 | 4.26 | 120 |
| 16 | 17.6 | 25.7 | 16.5 | 2296 | 50.2 | 52.8 | 4.24 | 110 |
| 17 | 17.5 | 27.7 | 16.5 | 2294 | 50.3 | 55.3 | 4.34 | 120 |
| 18 | 6.53 | 13.6 | 6.5 | 2012 | 42.3 | 48.9 | 4.38 | 120 |
| 19 | 42.3 | 30.6 | 39.5 | 2584 | 52.8 | 44.8 | 4.02 | 87 |
| 20 | 16.3 | 30.4 | 15.2 | 2289 | 50.1 | 55.3 | 4.36 | 120 |
| 21 | 38.8 | 3.3 | 45.2 | 2369 | 50.4 | 46.1 | 4.24 | 105 |
| 22 | 19.9 | 2.1 | 23.4 | 2258 | 47.9 | 49.5 | 4.14 | 118 |
| 23 | 11.3 | −0.9 | 13.1 | 2376 | 52.6 | 57.7 | 4.5 | 125 |
| 24 | 44.1 | 2.6 | 50.5 | 2606 | 56.5 | 46.0 | 4.26 | 88 |
| 25 | 22.1 | 0.5 | 17.7 | 2224 | 47.7 | 47.4 | 4.1 | 103 |
| 26 | 8.09 | 1.8 | 9.7 | 2009 | 45.8 | 44.4 | 4.52 | 111 |
| 27 | 6.14 | 2.8 | 7.3 | 2379 | 47.8 | 49.7 | 4.05 | 117 |
| 28 | 18.7 | −0.5 | 22.2 | 2207 | 47.5 | 49.9 | 4.16 | 118 |
| 29 | 36.2 | 25.7 | 33.3 | 2080 | 43.4 | 43.3 | 3.92 | 113 |
| 30 | 58.9 | 26.1 | 54.6 | 2464 | 52.8 | 44.1 | 3.91 | 88 |
| 31 | 61.1 | 12.9 | 61.6 | 2585 | 57 | 48.2 | 4.33 | 107 |
| 32 | 13 | 19.3 | 13 | 2130 | 48.6 | 48.5 | 4.25 | 107 |
| 33 | 21.5 | 18.1 | 21.5 | 2224 | 50.5 | 52 | 4.27 | 118 |
| 34 | 47.6 | 21.7 | 47.2 | 2169 | 48.1 | 43.6 | 4.14 | 116 |
| 35 | 11 | 24.7 | 10.7 | 1981 | 45.3 | 51.5 | 4.29 | 129 |
| 36 | 42.1 | 23.1 | 42.1 | 2271 | 49.4 | 42.7 | 4.06 | 95 |

TABLE 7

| Ex. No. | Vicat B/50 °C. | Low Shear Melt Viscosity 1 s⁻¹ Poise | Low Shear Melt Visc. 100 s⁻¹ Poise | High Shear Viscosity 1500 s⁻¹ Pa-s | High Shear Viscosity 5000 s⁻¹ Pa-s | High Shear Viscosity 10000 s⁻¹ Pa-s |
|---|---|---|---|---|---|---|
| 1 | 128 | 48800 | 8770 | 241 | 113 | 70.3 |
| 2 | 129.4 | 45700 | 11500 | 259 | 119 | 75.0 |
| 3 | 126.9 | 11420 | 5040 | 256 | 123 | 81.4 |
| 4 | 122.6 | 14900 | 5550 | 171 | 83 | 53.7 |
| 5 | 127.1 | 2550 | 8160 | 215 | 98.8 | 59.1 |
| 6 | 122.5 | 32400 | 9940 | 207 | 99.3 | 66.0 |
| 7 | 125 | 38500 | 11700 | 232 | 110 | 72.4 |
| 8 | 125.1 | 23300 | 7220 | 201 | 95.2 | 60.9 |
| 9 | 133.6 | 42800 | 15400 | 352 | 166 | 107 |
| 10 | 130.8 | 89200 | 17300 | 337 | 149 | 92.8 |
| 11 | 127.7 | 72000 | 14100 | 321 | 144 | 91.7 |
| 12 | 127.1 | 30300 | 9280 | 251 | 118 | 72.9 |
| 13 | 129.6 | 2980 | 9370 | 250 | 117 | 75.4 |
| 14 | 133.8 | 35500 | 12800 | 321 | 156 | 104 |
| 15 | 128.6 | 37000 | 11300 | 232 | 122 | 84.5 |
| 16 | 130.5 | 30200 | 9590 | 248 | 118 | 75.1 |

TABLE 7-continued

| Ex. No. | Vicat B/50 °C. | Low Shear Melt Viscosity 1 s$^{-1}$ Poise | Low Shear Melt Visc. 100 s$^{-1}$ Poise | High Shear Viscosity 1500 s$^{-1}$ Pa-s | High Shear Viscosity 5000 s$^{-1}$ Pa-s | High Shear Viscosity 10000 s$^{-1}$ Pa-s |
|---|---|---|---|---|---|---|
| 17 | 128.6 | 30600 | 9670 | 247 | 116 | 73.9 |
| 18 | 128.8 | 72300 | 13800 | 353 | 159 | 100 |
| 19 | 124.7 | 12900 | 4810 | 173 | 85.1 | 56.2 |
| 20 | 126.4 | 33500 | 9950 | 247 | 115 | 72.9 |
| 21 | 128.1 | 11417 | 5044 | 167 | 80.4 | 51.0 |
| 22 | 122.3 | 32703 | 8441 | 200 | 92.7 | 56.7 |
| 23 | 129.1 | 36624 | 12993 | 244 | 118.4 | 81.2 |
| 24 | 128.1 | 10134 | 4480 | 169 | 83.1 | 53.6 |
| 25 | 123.9 | 30472 | 7805 | 199 | 93.4 | 57.8 |
| 26 | 128.1 | 32072 | 7128 | 208 | 101.3 | 64.5 |
| 27 | 123.4 | 29768 | 7907 | 200 | 92.2 | 57.4 |
| 28 | 123.4 | 33378 | 8736 | 204 | 91.4 | 56.4 |
| 29 | 119 | 36101 | 5556 | 172 | 80.8 | 50.5 |
| 30 | 119.6 | 10892 | 3864 | 142 | 67.9 | 43.2 |
| 31 | 125.7 | 8374 | 3601 | 143 | 71.3 | 47.7 |
| 32 | 122.5 | 62323 | 11568 | 260 | 119.0 | 76.5 |
| 33 | 125.5 | 29187 | 7885 | 215 | 101.2 | 62.7 |
| 34 | 116.5 | 30095 | 5057 | 165 | 75.9 | 45.1 |
| 35 | 118.2 | 60384 | 12164 | 244 | 109.6 | 69.2 |
| 36 | 122.5 | 24910 | 5182 | 181 | 86.0 | 52.0 |

TABLE 8

| Ex. No. | 60° Gloss N111 GU | 85° Gloss N111 GU | 60° Gloss N122 GU | 85° Gloss N122 GU | 60° Gloss Montana GU | 85° Gloss Montana GU |
|---|---|---|---|---|---|---|
| 1 | 4.6 | 3.8 | 4.3 | 3.8 | 9.7 | 20.9 |
| 2 | 5.3 | 4.3 | 4.3 | 4.2 | 9.6 | 19.8 |
| 3 | 4.2 | 3.3 | 3.6 | 2.6 | 7.0 | 14.3 |
| 4 | 5.2 | 4.1 | 4.3 | 4.0 | 10.0 | 20.8 |
| 5 | 5.6 | 4.2 | 4.4 | 3.9 | 10.5 | 20.9 |
| 6 | N/A | N/A | 4.8 | 4.4 | 10.8 | 21.0 |
| 7 | 5.4 | 4.5 | 4.3 | 4.0 | 9.1 | 19.3 |
| 8 | 5.8 | 4.5 | 4.9 | 4.0 | 12.8 | 23.7 |
| 9 | 5.7 | 4.3 | 4.9 | 4.0 | 12.3 | 21.7 |
| 10 | 5.5 | 4.7 | 4.9 | 4.3 | 13.9 | 23.3 |
| 11 | 10.3 | 8.9 | 5.8 | 4.6 | 12.6 | 22.2 |
| 12 | 6.0 | 4.6 | 5.3 | 4.1 | 12.1 | 21.4 |
| 13 | 6.7 | 5.1 | 5.3 | 3.9 | 11.9 | 21.4 |
| 14 | 7.4 | 5.2 | 5.9 | 4.7 | 13.7 | 23.5 |
| 15 | 5.7 | 4.4 | 4.5 | 3.3 | 9.8 | 18.7 |
| 16 | 6.4 | 4.8 | 5.3 | 4.0 | 12.1 | 22.0 |
| 17 | 6.3 | 4.6 | 5.1 | 3.9 | 12.2 | 21.9 |
| 18 | 5.5 | 3.9 | 4.7 | 3.7 | 11.0 | 19.1 |
| 19 | 5.8 | 4.2 | 4.3 | 3.2 | 9.9 | 18.0 |
| 20 | 5.8 | 4.3 | 4.7 | 3.7 | 11.3 | 21.1 |
| 21 | 5.4 | 4.3 | 4.4 | 3.9 | 10.4 | 20.6 |
| 22 | 4.6 | 4.0 | 3.7 | 3.3 | 7.6 | 15.9 |
| 23 | 5.0 | 4.1 | 4.1 | 3.6 | 9.2 | 19.4 |
| 24 | 5.2 | 3.9 | 4.2 | 3.5 | 9.6 | 18.4 |
| 25 | 4.8 | 4.0 | 3.9 | 3.4 | 9.3 | 19.3 |
| 26 | 6.4 | 4.6 | 5.5 | 4.7 | 15.8 | 25.9 |
| 27 | 5.4 | 4.2 | 4.4 | 3.6 | 11.2 | 21.4 |
| 28 | 5.4 | 4.1 | 4.4 | 3.6 | 11.3 | 20.4 |
| 29 | 7.0 | 5.2 | 5.9 | 4.7 | 12.6 | 22.8 |
| 30 | 5.7 | 4.2 | 4.7 | 3.3 | 11.1 | 19.3 |
| 31 | 8.8 | 5.4 | 6.8 | 5.1 | 16.3 | 25.9 |
| 32 | 4.3 | 3.1 | 3.7 | 2.7 | 7.8 | 14.8 |
| 33 | 5.6 | 4.1 | 4.5 | 3.5 | 10.6 | 19.5 |
| 34 | 8.3 | 5.7 | 6.0 | 4.9 | 14.6 | 24.6 |
| 35 | 6.8 | 5.4 | 4.7 | 4.2 | 11.4 | 21.5 |
| 36 | 5.5 | 4.1 | 4.5 | 3.5 | 10.1 | 19.5 |

TABLE 9

| Ex. No. | 60° Gloss Rochester GU | 85° Gloss Rochester GU | 60° Gloss MT11030 GU | 85° Gloss MT11030 GU | 60° Gloss MT1055-2 GU | 85° Gloss MT1055-2 GU |
|---|---|---|---|---|---|---|
| 1 | 8.5 | 12.7 | 5.4 | 7.4 | 9.6 | 16.5 |
| 2 | 8.5 | 12.7 | 5.3 | 7.2 | 9.6 | 16.3 |
| 3 | 6.5 | 9.0 | 4.8 | 5.7 | 7.7 | 12.5 |
| 4 | 7.5 | 12.3 | 5.3 | 7.3 | 10.0 | 16.7 |
| 5 | 8.1 | 12.4 | 5.5 | 7.4 | 10.7 | 17.1 |
| 6 | 8.4 | 12.6 | 5.6 | 7.8 | 10.7 | 17.0 |
| 7 | 7.7 | 11.9 | 5.3 | 7.2 | 8.8 | 15.5 |
| 8 | 9.2 | 12.9 | 5.9 | 8.1 | 11.8 | 18.1 |
| 9 | 9.1 | 12.0 | 6.2 | 8.3 | 11.8 | 18.1 |
| 10 | 9.5 | 13.7 | 5.6 | 7.8 | 10.6 | 16.9 |
| 11 | 10.0 | 13.1 | 5.8 | 7.8 | 10.5 | 16.6 |
| 12 | 9.4 | 12.1 | 5.6 | 7.4 | 10.6 | 16.9 |
| 13 | 9.9 | 13.1 | 5.7 | 7.5 | 10.6 | 16.8 |
| 14 | 10.9 | 13.8 | 6.4 | 8.6 | 12.3 | 18.4 |
| 15 | 8.1 | 10.7 | 5.3 | 7.0 | 9.3 | 15.1 |
| 16 | 9.7 | 12.2 | 5.7 | 7.5 | 10.9 | 17.0 |
| 17 | 9.2 | 11.9 | 5.6 | 7.5 | 10.8 | 16.9 |
| 18 | 8.8 | 11.2 | 5.7 | 7.1 | 9.6 | 15.1 |
| 19 | 7.8 | 10.0 | 5.4 | 7.0 | 9.7 | 15.4 |
| 20 | 8.9 | 12.2 | 5.5 | 7.4 | 10.3 | 16.4 |
| 21 | 8.3 | 12.4 | 5.4 | 7.4 | 10.5 | 17.0 |
| 22 | 7.0 | 10.9 | 4.8 | 6.2 | 8.5 | 14.7 |
| 23 | 7.3 | 11.6 | 5.2 | 7.0 | 9.5 | 15.8 |
| 24 | 7.7 | 11.3 | 5.4 | 7.2 | 10.1 | 16.1 |
| 25 | 7.3 | 11.1 | 4.9 | 6.6 | 9.1 | 15.3 |
| 26 | 9.6 | 13.2 | 6.2 | 8.7 | 13.4 | 20.1 |
| 27 | 8.5 | 11.9 | 5.6 | 7.5 | 10.5 | 16.8 |
| 28 | 8.8 | 12.1 | 5.5 | 7.2 | 10.1 | 16.4 |
| 29 | 9.8 | 13.6 | 5.2 | 7.2 | 9.5 | 16.1 |
| 30 | 8.2 | 10.4 | 4.9 | 6.4 | 8.8 | 14.2 |
| 31 | 11.1 | 14.4 | 6.1 | 8.3 | 13.5 | 19.8 |
| 32 | 6.3 | 7.5 | 4.6 | 5.5 | 7.4 | 12.5 |
| 33 | 8.4 | 11.0 | 5.2 | 6.8 | 9.5 | 15.5 |
| 34 | 9.8 | 13.5 | 5.3 | 7.3 | 10.8 | 17.1 |
| 35 | 8.8 | 11.9 | 5.3 | 7.4 | 9.3 | 15.8 |
| 36 | 8.1 | 10.1 | 5.1 | 6.5 | 9.1 | 14.9 |

The data in Tables 3 to 9 shows that the Examples comprising a blend of a polycarbonate, a polycarbonate-polysiloxane copolymer, an impact modifier composition comprising BABS and a second impact modifier (MBS), SAN and a gel-type low gloss additive, have an excellent balance of properties, including low gloss, high melt flow and high impact without significant sacrifice in other physical properties. The Examples having a total SAN content of more than 10 wt. % did not have a balance of properties, particularly low temperature impact and gloss, that was as good as those having a lower total level of SAN as well as the polycarbonate-polysiloxane copolymer. Additionally, the Examples having a SAN-Gel content of greater than 1 wt. %, along with the polycarbonate-polysiloxane, did not have a balance of properties that was as good as those having no SAN-Gel or a very low level of SAN-Gel as well as the polycarbonate-polysiloxane copolymer.

As used herein, "(meth)acrylate" is inclusive of both acrylates and methacrylates. Further, as used herein, the terms "first," "second," and the like do not denote any order or importance, but rather are used to distinguish one element from another, and the terms "the", "a" and "an" do not denote a limitation of quantity, but rather denote the presence of at least one of the referenced item. All ranges disclosed herein for the same properties or amounts are inclusive of the endpoints, and each of the endpoints is independently combinable. All cited patents, patent applications, and other references are incorporated herein by reference in their entirety.

The modifier "about" used in connection with a quantity is inclusive of the stated value and has the meaning dictated by the context (that is, includes the degree of error associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic composition comprising:
   a polycarbonate,
   a polycarbonate-polysiloxane copolymer,
   an impact modifier composition comprising ABS or BABS,
   a second impact modifier different from BABS or ABS,
   an aromatic vinyl copolymer, and
   optionally a gel-type low gloss additive,
   wherein the 60° gloss of the thermoplastic composition is measured to be less than or equal to 14 GU on 3 millimeter chips having a textured surface when measured according to ASTM D2457,
   and wherein a molded sample of the thermoplastic composition has a low temperature notched Izod impact at −40° C. of at least 65 KJ/m$^2$ when measured according to ISO 180/1A.

2. The thermoplastic composition of claim 1, wherein the 60° gloss of the thermoplastic composition is measured to be less than or equal to 12.0 GU on 3 millimeter chips having a textured surface when measured according to ASTM D2457.

3. The thermoplastic composition of claim 1, wherein a molded sample of the thermoplastic composition has a low temperature notched Izod impact at −40° C. of at least 70 KJ/m$^2$ when measured according to ISO 180/1A.

4. The thermoplastic composition of claim 1, comprising 1 to 10 wt. % of the aromatic vinyl copolymer, and 0 to 1 wt. % of the gel-type low gloss additive, wherein the total amount of the aromatic vinyl copolymer and gel-type low gloss additive is no more than 10 wt. %.

5. The thermoplastic composition of claim 1, wherein the second impact modifier different from BABS or ABS is MBS.

6. The thermoplastic composition of claim 1, comprising 2 to 10 wt. % polycarbonate-polysiloxane copolymer.

7. An article comprising the thermoplastic composition of claim 1.

8. A thermoplastic composition comprising:
   50 to 87 wt. % of a polycarbonate,
   2 to 10 wt. % of a polycarbonate-polysiloxane copolymer,
   10 to 20 wt. % of an impact modifier composition comprising ABS or BABS,
   2 to 10 wt. % of a second impact modifier different from BABS or ABS,
   3 to 10 wt. % of an aromatic vinyl copolymer, and
   0 to 1 wt. % of a gel-type low gloss additive, wherein the total amount of the aromatic vinyl copolymer and the gel-type low gloss additive is no more than 10 wt. %,
   wherein the 60° gloss of the thermoplastic composition is measured to be less than or equal to 14 GU on 3 millimeter chips having a textured surface when measured according to ASTM D2457,
   and wherein a molded sample of the thermoplastic composition has a low temperature notched Izod impact at −40° C. of at least 65 KJ/m$^2$ when measured according to ISO 180/1A.

9. The thermoplastic composition of claim 8, wherein the 60° gloss of the thermoplastic composition is measured to be less than or equal to 12.0 GU on 3 millimeter chips having a textured surface when measured according to ASTM D2457.

10. The thermoplastic composition of claim 8, wherein a molded sample of the thermoplastic composition has a low temperature notched Izod impact at −40° C. of at least 70 KJ/m$^2$ when measured according to ISO 180/1A.

11. The thermoplastic composition of claim 8, wherein the second impact modifier different from BABS or ABS is MBS.

12. The thermoplastic composition of claim 8, comprising 5 to 10 wt. % polycarbonate-polysiloxane copolymer.

13. An article comprising the thermoplastic composition of claim 8.

14. A thermoplastic composition comprising:
   50 to 87 wt. % of a polycarbonate,
   2 to 10 wt. % of a polycarbonate-polysiloxane copolymer,
   10 to 20 wt. % of an impact modifier composition comprising ABS or BABS,
   2 to 10 wt. % of MBS,
   3 to 10 wt. % of SAN, and
   0 to 1 wt. % of a gel-type low gloss additive comprising SAN, wherein the total amount of the SAN and gel-type low gloss additive is no more than 10 wt. %,
   wherein the 60° gloss of the thermoplastic composition is measured to be less than or equal to 14 GU on 3 millimeter chips having a textured surface when measured according to ASTM D2457,
   and wherein a molded sample of the thermoplastic composition has a low temperature notched Izod impact at −40° C. of at least 65 KJ/m$^2$ when measured according to ISO 180/1A.

15. The thermoplastic composition of claim 14, wherein the 60° gloss of the thermoplastic composition is measured to be less than or equal to 12.0 GU on 3 millimeter chips having a textured surface when measured according to ASTM D2457.

16. The thermoplastic composition of claim 14, wherein a molded sample of the thermoplastic composition has a low temperature notched Izod impact at −40° C. of at least 70 KJ/m$^2$ when measured according to ISO 180/1A.

17. The thermoplastic composition of claim 14, wherein the second impact modifier different from BABS or ABS is MBS.

18. The thermoplastic composition of claim 14, comprising 5 to 10 wt. % polycarbonate-polysiloxane copolymer.

19. The thermoplastic composition of claim 14, wherein the 60° gloss of the thermoplastic composition is measured to be less than or equal to 12.0 GU on 3 millimeter chips having a textured surface when measured according to ASTM D2457 and wherein a molded sample of the thermoplastic composition has a low temperature notched Izod impact at −40° C. of at least 70 KJ/m$^2$ when measured according to ISO 180/1A.

20. An article comprising the thermoplastic composition of claim 14.

* * * * *